US012766423B2

(12) United States Patent
Yu

(10) Patent No.: US 12,766,423 B2
(45) Date of Patent: Oct. 20, 2026

(54) CARD CASTING METHOD AND APPARATUS, DEVICE, STORAGE MEDIUM, AND PROGRAM PRODUCT

(71) Applicant: Tencent Technology (Shenzhen) Company Limited, Shenzhen (CN)

(72) Inventor: Qingbo Yu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 253 days.

(21) Appl. No.: 18/212,638

(22) Filed: Jun. 21, 2023

(65) Prior Publication Data

US 2023/0330543 A1 Oct. 19, 2023

Related U.S. Application Data

(63) Continuation of application No. PCT/CN2022/130868, filed on Nov. 9, 2022.

(30) Foreign Application Priority Data

Jan. 21, 2022 (CN) ......................... 202210073064.9

(51) Int. Cl.
*A63F 13/822* (2014.01)
*A63F 13/5375* (2014.01)

(52) U.S. Cl.
CPC ........ *A63F 13/822* (2014.09); *A63F 13/5375* (2014.09)

(58) Field of Classification Search
CPC ........................... A63F 13/822; A63F 13/5375
See application file for complete search history.

(56) References Cited

U.S. PATENT DOCUMENTS 5,798,760 A * 8/1998 Vayda .................. G06F 3/0482 715/834
7,712,049 B2 * 5/2010 Williams ............ G06F 3/04817 715/752

(Continued)

FOREIGN PATENT DOCUMENTS

CN 107450812 A 12/2017
CN 109865282 A 6/2019

(Continued)

OTHER PUBLICATIONS

Tencent Technology, ISR, PCT/CN2022/130868, Jan. 18, 2023, 2 pgs.

(Continued)

*Primary Examiner* — Malina D. Blaise
(74) *Attorney, Agent, or Firm* — Morgan, Lewis & Bockius LLP

(57) ABSTRACT

Disclosed are a card casting method performed by a terminal device, belonging to the fields of Internet and computer technologies. The method includes: displaying a game application interface, the game application interface including a first card and a plurality of candidate positions corresponding to the first card; displaying a position selection control in response to a first operation on the first card, the position selection control including a plurality of trigger regions, each trigger region corresponding to a respective one of the plurality of candidate positions; determining a target position from the plurality of candidate positions in response to a second operation on a corresponding target trigger region of the position selection control; and casting the first card to the target position. The method simplifies the process of casting the first card to the target position in a game application and reducing operation difficulty in casting the first card.

20 Claims, 16 Drawing Sheets

(56) References Cited

U.S. PATENT DOCUMENTS

| | | | | |
|---|---|---|---|---|
| 8,245,156 | B2 * | 8/2012 | Mouilleseaux | G06F 3/04883 715/834 |
| 9,990,107 | B2 * | 6/2018 | Butcher | G06F 3/0482 |
| 11,130,062 | B2 * | 9/2021 | Yasuhara | A63F 13/822 |
| 12,097,429 | B2 * | 9/2024 | Ohashi | A63F 13/35 |
| 12,186,661 | B2 * | 1/2025 | Li | A63F 13/537 |
| 12,251,633 | B2 * | 3/2025 | Ueda | A63F 13/533 |
| 2010/0306702 | A1 * | 12/2010 | Warner | G06F 3/0482 715/834 |
| 2014/0213332 | A1 * | 7/2014 | Otsuka | A63F 13/30 463/2 |
| 2014/0327210 | A1 * | 11/2014 | Gerard | A63F 13/80 273/308 |
| 2015/0231499 | A1 * | 8/2015 | Mizukami | A63F 13/35 463/31 |
| 2015/0231500 | A1 * | 8/2015 | Aizono | A63F 13/422 463/31 |
| 2015/0238856 | A1 * | 8/2015 | Eika | A63F 13/70 463/31 |
| 2016/0124518 | A1 * | 5/2016 | Takahashi | G06F 3/04817 463/31 |
| 2018/0071632 | A1 * | 3/2018 | Takahashi | A63F 13/55 |
| 2018/0369693 | A1 * | 12/2018 | Rong | A63F 13/92 |
| 2020/0276502 | A1 * | 9/2020 | Gustafsson | A63F 13/53 |
| 2022/0387891 | A1 * | 12/2022 | Suenaga | A63F 13/46 |
| 2024/0131435 | A1 * | 4/2024 | Hoshino | A63F 13/822 |

FOREIGN PATENT DOCUMENTS

| | | | |
|---|---|---|---|
| CN | 110876849 | A | 3/2020 |
| CN | 111803934 | A | 10/2020 |
| CN | 113304479 | A | 8/2021 |
| CN | 114432697 | A | 5/2022 |
| JP | 2010170479 | A | 8/2010 |
| JP | 2016087083 | A | 5/2016 |

OTHER PUBLICATIONS

Tencent Technology, WO, PCT/CN2022/130868, Jan. 18, 2023, 5 pgs.

B's-Log.com, "[Bungo Stray Dogs Strategy Guide] How to Win Battles Smoothly and Earn Supernatural Stones in "Bungo Stray Dogs: The Legend of the Lost"" Dec. 2017, Retrieved from the Internet: https://www.bs-log.com/special/straydogs/20171226_1203448.html.

* cited by examiner

CARD CASTING METHOD AND APPARATUS, DEVICE, STORAGE MEDIUM, AND PROGRAM PRODUCT

CROSS-REFERENCE TO RELATED APPLICATIONS

This application is a continuation application of PCT Patent Application No. PCT/CN2022/130868, entitled "CARD CASTING METHOD AND APPARATUS, DEVICE, STORAGE MEDIUM, AND PROGRAM PRODUCT" filed on Nov. 9, 2022, which claims priority to Chinese Patent Application No. 202210073064.9, entitled "CARD CASTING METHOD AND APPARATUS, DEVICE, STORAGE MEDIUM, AND PROGRAM PRODUCT" filed on Jan. 21, 2022, all of which is incorporated by reference in its entirety.

FIELD OF THE TECHNOLOGY

This application relates to the fields of Internet and computer technologies, and in particular, to a card casting method and apparatus, a device, a storage medium, and a program product.

BACKGROUND OF THE DISCLOSURE

In some cases, a user needs to cast a card displayed in a game application interface to drive a development direction of the game.

In a related technology, a user completes an operation of casting a card to a target position by dragging. First, the user needs to select a card through an operation such as long press or click. After selecting the card, the user needs to continue the operation such as long press or click, and manually drags the card to the target position to complete the operation of casting the card.

However, in the related technology, the method of manually dragging a card to a target position results in a longer drag distance, which is not conducive to one-hand operation and leads to low operation convenience.

SUMMARY

This application provides a card casting method and apparatus, a device, a storage medium, and a program product. The technical solutions are as follows:

According to an aspect of embodiments of this application, a card casting method is performed by a terminal device, and the method includes:

- displaying a game application interface, the game application interface including a first card and a plurality of candidate positions corresponding to the first card;
- displaying a position selection control in response to a first operation on the first card, the position selection control including a plurality of trigger regions, each trigger region corresponding to a respective one of the plurality of candidate positions;
- determining a target position from the plurality of candidate positions in response to a second operation on a corresponding target trigger region of the position selection control; and
- casting the first card to the target position.

According to an aspect of the embodiments of this application, a terminal device is provided, the terminal device including a processor and a memory, the memory storing a computer program, and the computer program, when loaded and executed by the processor, causing the terminal device to implement the foregoing card casting method.

According to an aspect of the embodiments of this application, a non-transitory computer-readable storage medium is provided, the storage medium storing a computer program, and the computer program, when loaded and executed by a processor of a terminal device, causing the terminal device to implement the foregoing card casting method.

The technical solutions provided in the embodiments of this application include at least the following beneficial effects:

Selecting the target position through the position selection control avoids a situation where a user can only select the target position without dragging, and helps to simplify user operations. Because the display range of the position selection control is smaller than that of the game application interface, the operation distance of the second operation on the position selection control is short, which helps to shorten the time required to select the target position and cast the first card to the target position. Moreover, when the drag distance is relatively long, the drag operation used for casting a card is inconvenient for a one-hand operation, and is highly difficult. In this method, the position selection control may be operated with one hand, thereby avoiding problems of difficult operation of casting a card and difficulty in one-hand operation. Meanwhile, the second operation is performed on the position selection control. Compared with dragging a card to a target position, this method has little blockage caused by user operations on the game application interface in the process of determining the target position, which avoids a situation where the user mistakenly casts the first card to a wrong position due to operation blockage. In addition, selecting the target position through the position selection control has lower requirements for operation accuracy, and the user does not need to drag the first card to a response region of a candidate position to select the candidate position, which simplifies user operations.

DESCRIPTION OF EMBODIMENTS

Figure 1:
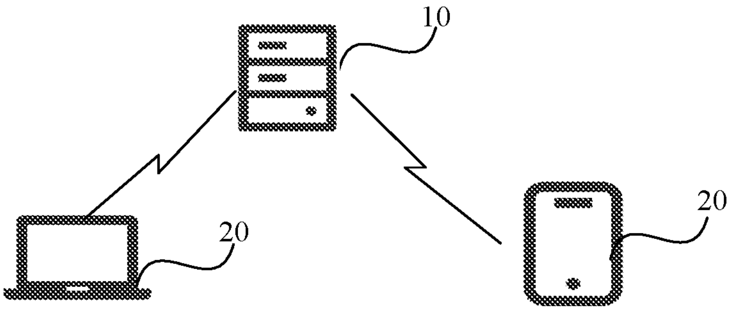
FIG. 1 is a schematic diagram of a program implementation environment according to an exemplary embodiment of this application.

To make the objectives, technical solutions, and advantages of this application clearer, the following further describes implementations of this application in detail with reference to the accompanying drawings.

First, terms involved in embodiments of this application are briefly introduced.

Game scene: It is a virtual environment displayed (or provided) when an application is running on a terminal device. The game scene may be a simulated world of the real world, a semi-simulated and semi-fictional three-dimensional world, or a purely fictional three-dimensional world. The game scene may be any of a two-dimensional game scene, a 2.5-dimensional game scene, and a three-dimensional game scene. In some embodiments, the game scene is also used for a game scene battle between at least two virtual objects, and the game scene has virtual resources available for the at least two virtual objects. In some embodiments, the game scene includes a lower left corner region and an upper right corner region that are symmetrical, and virtual objects belonging to two hostile camps occupy one of the regions separately, and destroy a target building/fort/base/crystal deep in the opponent's region as a victory goal. The game scene mentioned in the embodiments of this application may alternatively be considered as a virtual environment, and the two belong to the same concept.

Virtual object: It refers to movable objects and immovable objects in the game scene. The movable objects may be at least one type of virtual roles (virtual characters), virtual animals, and cartoon characters. The immovable objects may be at least one type of virtual buildings, virtual plants, and virtual terrains. In some embodiments, when the game scene is a three-dimensional game scene, virtual scenes may be three-dimensional virtual models, and each virtual object has a shape and a volume in the three-dimensional game scene, and occupies some space in the three-dimensional game scene. In some embodiments, the virtual object is a three-dimensional character constructed based on three-dimensional human skeleton technology, and the virtual object wears different skins to show different appearance. In some implementations, the virtual object may alternatively be implemented by using a 2.5-dimensional or 2-dimensional model, which is not limited in the embodiments of this application. For example, virtual objects may be divided into user controlled virtual objects and server controlled virtual objects based on different ways of controlling the virtual objects, where the user controlled virtual objects are objects that are controlled by a client and are movable in the game scene. The server controlled virtual objects are virtual objects controlled by automatic control algorithms or artificial intelligence programs on the client or a server. The server controlled virtual objects include movable objects and immovable objects in the game scene. For example, an immovable object may respond to or affect the activity of a movable object. For example, the movable object may destroy the immovable object, or when the movable object enters the immovable object, the movable object enters an invisible state. For example, the virtual objects in this application are client controlled virtual objects. For example, the target virtual object in this application may be a virtual object controlled by another client or server.

Multiplayer online battle arena game (MOBA): In a game scene, different virtual teams belonging to at least two hostile camps occupy map regions respectively and compete with the goal of a victory condition. The victory condition includes but is not limited to at least one of occupying forts or destroying forts of a hostile camp, killing a virtual object of the hostile camp, surviving in a designated scene and time, seizing a resource, and surpassing opponent's scores within a designated time. Tactical competitions may be conducted on a per game basis, and a map for each game may be the same or different. Each virtual team includes one or more virtual objects, such as 1, 2, 3, or 5. In some embodiments, the MOBA is a game that provides several forts in the game scene, and that users from different camps control virtual objects to engage in battles, occupy forts, or destroy forts of the hostile camp in the game scene. For example, the MOBA may divide users into two hostile camps, and disperse virtual objects controlled by the users into the game scene to compete with each other, with a victory condition of destroying or occupying all enemy's forts. Duration of the MOBA is from the beginning of the game to the moment when the victory condition is satisfied.

User interface (UI) control: Any visual control or element that can be seen on a user interface of an application, such as controls of pictures, input boxes, text boxes, buttons, labels, and the like. Some UI controls respond to user operations, for example, a skill control controls a virtual object to release a skill. A user triggers the skill control to control the virtual object to release the skill. UI controls involved in the embodiments of this application include but are not limited to: a skill control and an evolution control. In some embodiments, the user interface is a game application interface.

FIG. 1 is a schematic diagram of a program implementation environment according to an exemplary embodiment of this application. The program implementation environment may be implemented as a computer system, such as an interface display system or a game application system. The program implementation environment may include: a terminal device 10.

The terminal device 10 may be an electronic device such as a mobile phone, a tablet computer, a PC (Personal Computer), a multimedia playback device, a wearable device, an intelligent voice interaction device, a smart home appliance, or a vehicle terminal. In one example, a target application runs in the terminal device 10, and the target application may be a game application or another application that can provide game functions. For example, the game application in the terminal device 10 is a card game application. A client of the target application can determine a target position from a plurality of candidate positions in response to a second operation on a position selection control, and cast a first card to the target position.

In the case that the target application runs in the terminal device 10, the program implementation environment may further include: a server 20.

The server 20 can provide back-end services for the target application running in the terminal device 10, for example, the server 20 may be a back-end server of the target application. The server 20 may provide services for the terminal device 10. The server 20 may be an independent physical server, or a server cluster or distributed system including a plurality of physical servers, or a cloud server providing basic cloud computing services such as cloud services, cloud computations, cloud functions, cloud storages, network services, cloud communications, domain name services, and artificial intelligence platforms. The server 20 has at least data transmitting and receiving, storage, and computing functions.

Hereinafter, the target application is a card game application as an example to introduce a data transmission process between the terminal device 10 and the server 20.

In one example, after the terminal device 10 casts the first card to the target position, the terminal device 10 sends game data to the server 20. In some embodiments, the game data include: attribute information of the first card and the target position. The server 20 receives the game data sent by the terminal device 10. The server 20 performs a computation according to the received game data to obtain a computation result, and sends the computation result to the terminal device 10. The terminal device 10 changes attribute information of other display elements in the game interface according to the received computation result.

In another example, the terminal device 10 performs a computation according to the attribute information of the first card and the target position, and changes attribute information of other display elements in the game interface according to the computation result. In some embodiments, the terminal device 10 may send the computation result to the server 20. The server 20 receives the computation result sent by the terminal device 10 and sends the computation result to a terminal device. The terminal device is loaded with a client of the target application, and the client is in the same game as the client in the terminal device 10.

Figure 2:
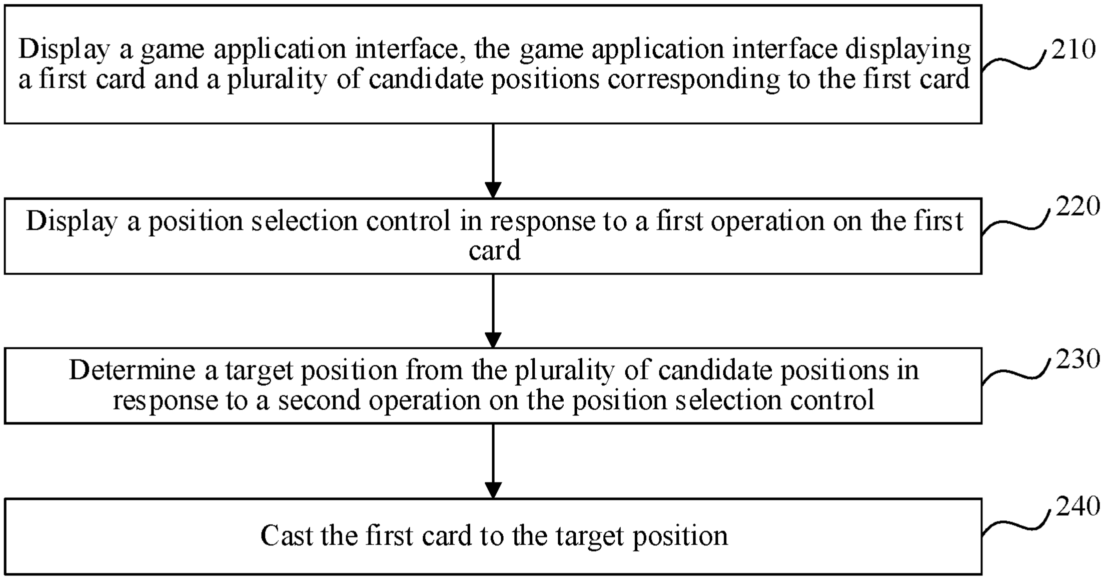
FIG. 2 is a flowchart of a card casting method according to an exemplary embodiment of this application.

FIG. 2 is a flowchart of a card casting method according to an exemplary embodiment of this application. For example, an executive subject of this method may be the terminal device 10 in the program implementation environment described in FIG. 1. For example, the executive subject may be a client of the target application running in the terminal device 10. As shown in FIG. 2, the method may include at least one of the following steps (210-240):

Step 210: Display a game application interface, the game application interface displaying a first card and a plurality of candidate positions corresponding to the first card.

Game application interface: An interface generated according to a target application. In some embodiments, the target application includes but is not limited to at least one of a simulation program, a hit and run shooting game, a virtual reality (VR) application, an augmented reality (AR) program, a three-dimensional map program, a virtual reality game, an augmented reality game, a first-person shooting game (FPS), a multiplayer gunfight survival game, a third-person shooting game (TPS), a multiplayer online battle arena game, and a simulation game (SLG). In some embodiments, the game application interface displays a first card and at least one candidate position corresponding to the first card. In some embodiments, the game application interface is further used for displaying a game process, that is, the game application interface also displays other content in addition to the first card and the plurality of candidate positions corresponding to the first card. For example, the target application is a card game application, and the game application interface further displays game content related to the card game, such as virtual game elements and game scene screens, where the virtual game elements include but are not limited to: a cast object of the card and a position region with specific functions (such as a spring with a healing function and a defense tower with a range attack capability). The specific content displayed in the game application interface is determined according to an actual usage scene of the card casting method, and is not limited here in this application. In some embodiments, the game application interface displays a game scene, virtual objects, a first card, and a plurality of candidate positions corresponding to the first card. This embodiment of this application does not limit specific positions of the first card and the plurality of candidate positions corresponding to the first card displayed on the game application interface. The first card may appear in a form of a user UI control at any position on the game application interface, or at a specific position on the game application interface, where the specific position may be preset by a server or set by a user. This application does not limit a specific type of the game scene, which may be a three-dimensional game scene, a two-dimensional scene, or a game scene of other dimensions. In some embodiments, the game application interface displays a three-dimensional game scene, and the plurality of candidate positions corresponding to the first card are located in the three-dimensional game scene. In some embodiments, MOBA is used as an example. In some embodiments, the candidate positions are an up road (an adversarial road), a down road (a developmental road), a middle road, or the like in the three-dimensional game scene. In some embodiments, the candidate positions are a dragon pit position, a defense tower position, a crystal position, and the like in the three-dimensional game scene. That is, the first card may correspond to a UI control on the game application interface, the candidate positions corresponding to the first card are in the three-dimensional game scene, and the candidate positions do not correspond to the UI control, that is, the first card and the plurality of candidate positions corresponding to the first card are on different levels. In other embodiments, some of the plurality of candidate positions corresponding to the first card may be on the same level as the first card, while the other may not be on the same level as the first card. The technical solution provided in this embodiment of this application may dynamically combine the first card with the three-dimensional game scene by setting the candidate positions in the three-dimensional game scene, thereby improving fun, flexibility, and operability of card casting and further enhancing user's gaming experience.

First card: A virtual item in the target application. This embodiment of this application does not limit a specific form of the card. The card may be displayed in a specific card form or in a non-card form. In some embodiments, the first card may be cast to a specific virtual object, a specific game scene, a specific position in the game scene, a specific virtual item, or the like. In some embodiments, the first card may be cast to a virtual object to change attributes of the virtual object. In some embodiments, the first card is a positive gain card capable of improving an attack attribute of the virtual object and enhancing a defense attribute of the virtual object, or a negative gain card capable of reducing an attack attribute of the virtual object and reducing a defense attribute of the virtual object. In other embodiments, the first card may be cast to a specific game scene. In some embodiments, the first card may be used for changing a color and layout of the first game scene, and the first card may further be used for giving positive/negative gains to all virtual objects located in the first game scene. In other embodiments, the first card may alternatively be cast to a specific virtual item. In some embodiments, the first card is cast to a first virtual item to change a form/attribute of the first virtual item. In this embodiment of this application, the first card may be cast by a third-party user against the game, or the first card may be cast by an internal user in the game. This application does not limit a subject of casting the first card. In some embodiments, the third-party user against the game casts the first card to increase game operation difficulties for users in the game, so as to enhance the fun and operability of the game. In other embodiments, the internal user in the game casts the first card to better match the game situation, so as to enhance unexpected effects and improve user's gaming experience. If the third-party user against the game casts the card, it may be considered that the first card is a second virtual item and may be converted from virtual resources, for example, the first card is converted from virtual resources such as coins and diamonds. If the internal user in the game casts the first card, it may be considered that the first card is a first virtual item and may be obtained by a virtual object in the game. In some embodiments, card casting may be operated by some specific user accounts, such as user accounts with specific identities and user accounts with specific permissions. In some embodiments, the first card is used for changing attributes (such as ability attributes and forward directions) of virtual game elements displayed in the game application interface. In some embodiments, the game application interface also displays other cards in addition to the first card and the corresponding at least one candidate position. In some embodiments, types of the other cards may be the same or similar to the type of the first card. For example, the game application interface displays a first card, a second card, and a third card, where the first card, the second card, and the third card are all used for affecting the attributes of some virtual game elements. In some embodiments, candidate positions corresponding to the other cards are the same as the candidate positions corresponding to the first object, that is, the other objects may also be cast to the plurality of candidate positions corresponding to the first object. The plurality of candidate positions corresponding to the first card are used for displaying or casting the first card, that is, the candidate positions are cast points for the first card. The candidate position may be a point or a region. The first card is cast to the candidate position to play its role and affect the development of a game plot. The first object can change the attributes of all of or some of the virtual game elements in the corresponding action region of the candidate position. In some embodiments, the first card can be cast to any of the plurality of candidate positions corresponding to the first card. At least one candidate position corresponding to different cards may be the same; or at least one candidate position corresponding to different first cards may not be completely the same. For example, the first card A functions to affect an attribute of a virtual object in the game application interface (for example, update a forward direction of a virtual object), and the first card B functions to affect an attribute of a position region with a specific function (for example, reduce attack power of a defense tower). An action region of a candidate position corresponding to the first card A includes at least one virtual character, and an action region of a candidate position corresponding to the first card B includes at least one position region with a specific function, so the candidate positions corresponding to the first card A and the first card B may not be completely the same.

In some embodiments, the candidate positions corresponding to the first card are determined by attribute information of the first card. The attribute information of the first card includes at least one of the following: a display size of the first card, a type of the first card, an action object of the first card, and the like. In some embodiments, the terminal device determines a corresponding candidate position according to the action object of the first card, and the terminal device may also determine a candidate position corresponding to the first card according to the type of the first card. In some embodiments, except that at least one candidate position corresponding to the first card is determined according to the attribute information of the first card, at least one candidate position may also be determined according to other information other than the content displayed in the game application interface. For example, the terminal device determines at least one candidate position corresponding to the first card in a stage according to user's decisions in different stages of the card game. Assuming that the user's decision in a stage is attack, the terminal device determines at least one position suitable for serving as an attack point in the game application interface as a candidate position.

Step 220: Display a position selection control in response to a first operation on the first card.

The terminal device displays the position selection control in response to the first operation on the first card. The first operation is used for the first card and displays the position selection control. The first operation includes at least one of the following: click, long press, swipe, gesture, voice, and the like. This application does not limit a specific type and representation of the first operation. In some embodiments, the first operation is long press on the first card. After recognizing the long press operation on the first card, the terminal device displays the position selection control in the game application interface. In some embodiments, the terminal device determines, by detecting duration of a long press event, whether the user has engaged in the long press event. For example, a specific algorithm for the terminal device to determine whether a long press event has occurred is as follows: recording a time point $t_0$ when the user presses a screen and a time point $t_1$ when the user releases the screen; and computing duration t for long press on the screen, where $t=t_1-t_0$. When t is greater than or equal to N seconds (N is a positive integer), the terminal device recognizes the long press operation on the first card. The magnitude of N is determined by presetting, for example, N=2 is preset.

The position selection control is used for determining a target position corresponding to the first card. In some embodiments, the position selection control is a user interface (UI) control. In some embodiments, the position selection control includes at least one trigger region. There is a corresponding relationship between the trigger region and the candidate position. In some embodiments, one trigger region corresponds to only one candidate position, but different trigger regions may correspond to the same candidate position. For example, the candidate positions displayed on the game application interface include: candidate position 1, candidate position 2, and candidate position 3. The position selection control includes 4 trigger regions, respectively trigger region 1, trigger region 2, trigger region 3, and trigger region 4. Trigger region 1 corresponds to candidate position 2, trigger region 2 corresponds to candidate position 3, trigger region 3 corresponds to candidate position 1, and trigger region 4 corresponds to candidate position 2. That is, a candidate position corresponding to a trigger region may be indirectly selected through the trigger region in the position selection control and the corresponding relationship between the trigger region and the candidate position. In this embodiment of the present application, the trigger region in the position selection control may be displayed in response to a second operation or not.

In some embodiments, a display size of the position selection control may be determined by presetting or customized by the user. In some embodiments, the terminal device determines the display size of the position selection control by referring to a linear distance between the first card and a nearest candidate position. For example, the display size of the position selection control is less than the linear distance, or close to the linear distance. In this case, the operation distance of user's second operation on the position selection control is shorter than the motion distance of directly dragging the first control to any candidate position, which helps to shorten duration for the user to complete the card casting operation. The position selection control includes but is not limited to a wheel form and a button form. In some embodiments, the position selection control may be in any shape, such as a circle, a sector, or a rectangle. The display shape of the position selection control may be determined according to actual display content in the game application interface or may be set by the user, which is not limited here in this application. In some embodiments, users who cast cards may set different styles of position selection controls on the game application interface according to personal operating habits. In the technical solution provided in this embodiment of this application, the position selection control may be set by oneself to meet requirements of different users. For some operations that do not require high sensitivity, a relatively large position selection control may be set to make subsequent operations on the position selection control clearer, without causing errors in determining a target position due to accidental touch or other reasons.

In some embodiments, the position selection control is displayed on an upper layer of the first card. The position selection control may be displayed at any position in the game application interface. In order to reduce blockage on other display information in the game application interface due to the display of the position selection control, the terminal device may display the position selection control in a position without the other display information in the game application interface. In other embodiments, the terminal device may adjust display transparency of the position selection control, and the position display control is enabled not to completely cover other display information in the game application interface, so as to reduce the blockage on the other display information in the game application interface due to the display of the position selection control. Refer to the following embodiments for details on determining a display position of the position selection control in the game application interface.

Step 230: Determine a target position from the plurality of candidate positions in response to a second operation on the position selection control.

In some embodiments, the second operation acts on the position selection control and is used for determining the target position. The second operation includes but is not limited to click, long press, slide, gesture, voice, and the like on the position selection control. In some embodiments, an operation method of the second operation is related to a display form of the position selection control. For example, when the display form of the position selection control is a wheel, the second operation on the position selection control is a continuous slide operation within a recognizable region of the position selection control. For another example, when the display form of the position selection control is multiple consecutive buttons, the second operation on the position selection control is click on a button or a slide operation on the several consecutive buttons. This application does not limit a specific type and representation of the second operation.

In some embodiments, the terminal device determines the target position in the first card in response to the second operation on the position selection control. Refer to the following embodiments for a specific process of determining the target position from the plurality of candidate positions according to the second operation.

Step 240: Cast the first card to the target position.

In some embodiments, after determining the target position from the plurality of candidate positions through the second operation, the terminal device casts the first card to the target position, so that the first card plays a role in an action region of the target position, to complete the process of casting the first card.

In some embodiments, in the process of casting the first card, the game application interface also displays a casting effect, for example, the first card moves towards the target position, or the first card turns into a star effect, so that the casting of the card is more vivid and the fun of card casting is enhanced.

In summary, selecting the target position through the position selection control avoids a situation where a user can only select the target position without dragging, and helps to simplify user operations. Because the display range of the position selection control is smaller than that of the game application interface, the operation distance of the second operation on the position selection control is short, which helps to shorten the time required to select the target position and cast the first card to the target position. Moreover, when the drag distance is relatively long, the drag operation used for casting a card is inconvenient for a one-hand operation, and is highly difficult. In this method, the position selection control may be operated with one hand, thereby avoiding problems of difficult operation of casting a card and difficulty in one-hand operation. Meanwhile, the second operation is performed on the position selection control. Compared with dragging a card to a target position, this method has little blockage caused by user operations on the game application interface in the process of determining the target position, which avoids a situation where the user mistakenly casts the first card to a wrong position due to operation blockage. In addition, selecting the target position through the position selection control has lower requirements for operation accuracy, and the user does not need to drag the first card to a response region of a candidate position to select the candidate position, which improves operation convenience.

Hereinafter, the process of determining the target position will be introduced and explained through several embodiments.

In some embodiments, the determining a target position from the plurality of candidate positions includes: determining, by the terminal device, a target trigger region matching attribute information of the second operation from a plurality of trigger regions corresponding to the position selection control; and determining, by the terminal device, a candidate position corresponding to the target trigger region among the plurality of candidate positions as the target position.

The trigger region refers to a region used for responding to the second operation in the position selection control. In some embodiments, the position selection control corresponds to at least one trigger region used for responding to the second operation. For example, the position selection control corresponds to two trigger regions. The position selection control is vertically segmented, where the segmented left part corresponds to trigger region 1, and the segmented right part corresponds to trigger region 2. In some embodiments, the one-to-one correspondence between a plurality of trigger regions and a plurality of candidate positions indicates that there is a corresponding candidate position for each trigger region. Meanwhile, a trigger region can correspond to only one candidate position, and a candidate position can correspond to only one trigger region. Accordingly, a quantity of candidate positions displayed in the game application interface is equal to a quantity of trigger regions corresponding to the position selection control.

Figure 3:
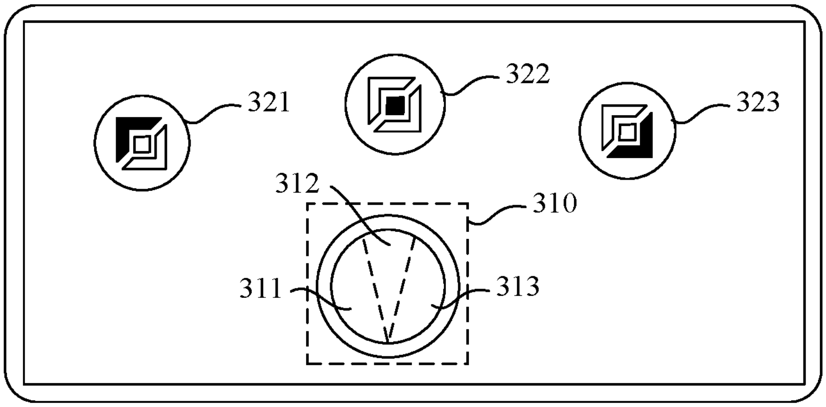
FIG. 3 is a schematic diagram of a corresponding mode between trigger regions and candidate positions according to an exemplary embodiment of this application.

In some embodiments, the corresponding relationship between the trigger regions and the candidate positions is preset. For the convenience of user's determination on the corresponding relationship between the trigger regions and the candidate positions, the corresponding relationship between the trigger regions and the candidate positions may be determined according to the corresponding relationship between the trigger regions and the position selection control, as well as the distribution of the candidate positions in the game application interface. FIG. 3 shows a corresponding mode between trigger regions and candidate positions, where the position selection control 310 corresponds to 3 trigger regions, and the game application interface displays 3 candidate regions for the first card. As shown in FIG. 3, the 3 trigger regions from left to right are a first trigger region 311, a second trigger region 312, and a third trigger region 313, respectively; and the 3 candidate regions from left to right are a first candidate position 321, a second candidate position 322, and a third candidate position 323, respectively. According to the distribution relationship between the trigger regions and the candidate positions, it may be determined that the leftmost trigger region in the position selection control 310 corresponds to the leftmost candidate position in the game application interface, and so on. That is, the corresponding relationship between the 3 trigger regions and the 3 candidate positions is as follows: The first trigger region 311 corresponds to the first candidate position 321, the second trigger region 312 corresponds to the second candidate position 322, and the third trigger region 313 corresponds to the third candidate position 323.

Figure 4:
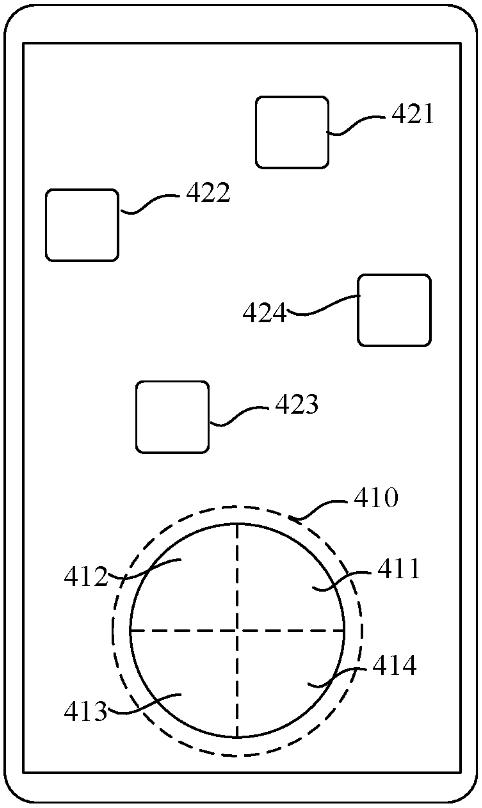
FIG. 4 is a schematic diagram of a corresponding mode between trigger regions and candidate positions according to another exemplary embodiment of this application.

In some embodiments, the corresponding relationship between the trigger regions and the candidate positions is determined by the user. The user may adjust the corresponding relationship between the trigger regions and the candidate positions according to operating habits. FIG. 4 shows a corresponding mode between trigger regions and candidate positions, where the position selection control 410 includes 4 trigger regions, and the game application interface displays 4 candidate positions. As shown in FIG. 4, the 4 trigger regions are distributed in cross plane quadrants. The 4 trigger regions are a first trigger region 411, a second trigger region 412, a third trigger region 413, and a fourth trigger region 414, respectively; and the 4 candidate positions are a first candidate position 421, a second candidate position 422, a third candidate position 423, and a fourth candidate position 424, respectively. The user may preset a specific corresponding relationship through operating habits, and the terminal device determines, according to the specific corresponding relationship, a corresponding relationship between the 4 trigger regions and the 4 candidate positions as follows: The first trigger region 411 corresponds to the first candidate position 421, the second trigger region 412 corresponds to the second candidate position 422, the third trigger region 413 corresponds to the fourth candidate position 424, and the fourth trigger region 414 corresponds to the third candidate position 423.

The attribute information of the second operation is used for describing information related to the second operation performed in the position selection control. The attribute information of the second operation includes at least one of the following: a start position, an end position, a motion distance, direction information, a start time, an end time, and duration. The start position refers to a start point of the second operation in the position selection control. The end position refers to a position where the second operation ends in the position selection control, or a position where the second operation is triggered. The direction information refers to a trigger direction of the second operation in the position selection control. For example, the terminal device detects that a second operation vertically points to a lower edge of the game application interface, and the terminal device determines that the direction information of the second operation is down. In some embodiments, the direction information may alternatively be determined according to a relative position relationship between the start position and the end position. For example, if the end position is above the start position, the direction information of the second operation is up. The start time refers to a time when the terminal device recognizes the second operation. The end time refers to a time when the terminal device recognizes the end of the second operation, for example, the terminal device determines a time when the user's finger leaves the position selection control as the end time.

In some embodiments, the attribute information of the second operation includes at least a trigger position. The trigger position refers to a position at which the terminal device responds to the second operation. The trigger position may be the end position, for example, after the terminal device recognizes a user's second operation on a position selection device, the recognized position where the user's finger leaves the screen is used as the trigger position. The terminal device determines the target position from the at least one candidate position corresponding to the first card according to the end position of the second operation. The trigger position may alternatively be a corresponding position when the user completes a second operation.

In some embodiments, the plurality of trigger regions and candidate positions correspond one to one. Therefore, after the target trigger region is determined according to the second operation, the candidate position corresponding to the target trigger region may be directly determined as the target position.

In other embodiments, the trigger regions and the candidate positions do not correspond one to one. In this case, the candidate position corresponding to the target trigger region cannot be directly used as the target position. Refer to the following embodiments for the method of determining a target position in the case that the trigger regions and the candidate positions do not correspond one to one.

In some embodiments, the determining, by the terminal device, a target trigger region matching attribute information of the second operation from a plurality of trigger regions corresponding to the position selection control includes:

determining coordinate information of the trigger position of the second operation based on the attribute information of the second operation, the coordinate information including a horizontal coordinate and a vertical coordinate of the trigger position; determining a first set of trigger regions from the plurality of trigger regions according to the horizontal coordinate of the trigger position, where each trigger region in the first set of trigger regions has at least one position with the same horizontal coordinate as the trigger position; determining a second set of trigger regions from the plurality of trigger regions according to the vertical coordinate of the trigger position, where each trigger region in the second set of trigger regions has at least one position with the same vertical coordinate as the trigger position; and determining an intersection of the first set of trigger regions and the second set of trigger regions as the target trigger region. For example, the position selection control corresponds to 3 trigger regions, the second operation is a finger slide operation, the process of determining, by the terminal device, a target trigger region matching attribute information of the second operation from a plurality of trigger regions corresponding to the position selection control will be introduced below. In this case, a plurality of trigger regions and a plurality of candidate positions correspond one to one.

The coordinate information of the trigger position=(the coordinate of the trigger position on an x-axis, and the coordinate of the trigger position on a y-axis).

The position selection control corresponds to 3 trigger regions, respectively a left region, a middle region, and a right region. The left region of the position selection control includes: a boundary of the left region of the position selection control (namely, each coordinate point that constitutes this boundary), and a boundary of inner and outer regions of the left region that is originated from a center point of the position selection control and extended along edge lines on left and right sides of the boundary of the left region of the position selection control until an edge of the game application interface. The middle region of the position selection control includes: a boundary of the middle region of the position selection control (namely, each coordinate point that constitutes this boundary), and a boundary of inner and outer regions of a wheel that is originated from the center point of the position selection control and extended along edge lines on left and right sides of the boundary of the middle region of the position selection control until the edge of the game application interface. The right region of the position selection control includes: a boundary of the right region of the position selection control (namely, each coordinate point that constitutes this boundary), and a boundary of inner and outer regions of a wheel that is originated from the center point of the position selection control and extended along edge lines on left and right sides of the boundary of the right region of the wheel until the edge of the game application interface.

In some embodiments, the terminal device detects and determines a movement position of the second operation through the boundaries corresponding to each trigger region obtained above.

If the horizontal coordinate and vertical coordinate of the trigger position of the second operation are both within the boundary of the left region of the position selection control (namely, each coordinate point that constitutes this boundary), the movement position of the second operation is detected and determined as pass.

Alternatively, if the horizontal coordinate and vertical coordinate of the trigger position of the second operation are both within the boundary of the middle region of the position selection control (namely, each coordinate point that constitutes this boundary), the movement position of the second operation is detected and determined as pass.

Alternatively, if the horizontal coordinate and vertical coordinate of the trigger position of the second operation are both within the boundary of the right region of the position selection control (namely, each coordinate point that constitutes this boundary), the movement position of the second operation is detected and determined as pass.

Alternatively, if the horizontal coordinate and vertical coordinate of the trigger position of the second operation cannot be simultaneously distributed in the same trigger region, the movement position of the second operation is detected and determined as no pass. For example, if a trigger position is on the boundary shared by the left region and the middle region, the terminal device determines that the movement position of the second operation corresponding to the trigger position does not pass.

In the technical solution provided in this embodiment of this application, the terminal device determines the target trigger region matching the attribute information of the second operation from the plurality of trigger regions corresponding to the position selection control, where the target trigger region may be determined according to the attribute information of the second operation, that is, the determination of the target trigger region is an operation associated with the second operation. Therefore, operation skills of a card caster are more dependent, methods for determining a target trigger region of a card are enriched, and interactivity of a game increased.

In some embodiments, the terminal device determines the first set of trigger regions based on the horizontal coordinate of the trigger position of the second operation, where each trigger region in the first set of trigger regions has at least one position with the same horizontal coordinate as the trigger position. The terminal device determines the second set of trigger regions based on the vertical coordinate of the trigger position of the second operation, where each trigger region in the second set of trigger regions has at least one position with the same vertical coordinate as the trigger position. The terminal device determines the intersection of the first set of trigger regions and the second set of trigger regions as the target trigger region. For example, the first set of trigger regions includes trigger region 1 and trigger region 2; and the second set of trigger regions includes trigger region 2 and trigger region 3. Because both the first set of trigger regions and the second set of trigger regions include trigger region 2, the terminal device determines trigger region 2 as the target trigger region.

In the technical solution provided in this embodiment of this application, the coordinate information of the trigger position of the second operation is determined through the attribute information of the second operation, and the target trigger region is determined from the plurality of trigger regions according to the horizontal coordinate and the vertical coordinate of the trigger position. That is, the target trigger region is determined according to the attribute information of the second operation, so that the determination of the target trigger region is more accurate.

The following introduces the method of determining a target position in the case that the trigger regions and the candidate regions do not correspond one to one, for example, a trigger region corresponds to a plurality of candidate positions.

In some embodiments, the determining a candidate position corresponding to the target trigger region among the plurality of candidate positions as the target position includes: in a case of more than one candidate position corresponding to the target trigger region, in response to a third operation on the position selection control, determining the target position from the more than one candidate position according to attribute information of the third operation.

In some embodiments, one trigger region corresponds to more than one candidate position, indicating that the number of candidate positions displayed on the game application interface is not equal to the number of trigger regions corresponding to the position selection control. For example, the number of candidate positions is greater than the number of trigger regions. In this case, the terminal device may first partition the candidate positions to obtain candidate partitions equal to the trigger regions in number, where any candidate partition includes at least one candidate position. That is, the candidate positions corresponding to one trigger region belong to the same candidate partition, and the more than one candidate position corresponding to the trigger region may be collectively referred to as a candidate partition. For example, the position selection control corresponds to a trigger regions, the game application interface displays b candidate positions, and the terminal device partitions the b candidate positions into a candidate partitions, where a and b are positive integers and b>a. In some embodiments, at least two candidate partitions include an equal number of candidate positions. For example, according to the previous embodiment, the first a−1 candidate partitions include [b/a] candidate positions ("[ ]" is a rounding symbol), and the $a^{th}$ candidate partition includes b mod a candidate positions ("mod" is a remainder symbol). In other embodiments, the terminal device partitions the game application interface into c regions, in one of which all target positions displayed belong to the same candidate partition.

In some embodiments, in order to reduce user's repeated second operations, the number of candidate positions in a candidate partition is less than or equal to the number of trigger regions corresponding to the position selection control, that is, the total number of more than one candidate position corresponding to a trigger region is less than the total number of trigger regions in the position selection control. For example, the game application interface displays 15 candidate positions, the position selection control corresponds to 4 trigger regions, and the terminal device may partition the 15 candidate positions into 4 candidate partitions, respectively a first candidate partition, a second candidate partition, a third candidate partition, and a fourth candidate partition. The first candidate partition, the second candidate partition, and the third candidate partition each have 4 candidate positions, and the fourth candidate partition includes 3 candidate positions. Through the foregoing method, regardless of whether the user desires to determine any of the 15 candidate positions as the target candidate position, only 2 operations are required for the position selection control (the second operation on the position selection control and the third operation on the position selection control). In some embodiments, after the candidate positions are partitioned, the terminal device establishes a corresponding relationship between candidate partitions and trigger regions. Refer to the foregoing embodiments for the specific process.

The terminal device determines, in response to the third operation on the position selection control, the target position from the more than one candidate position according to the attribute information of the third operation. In some embodiments, the operation methods of the third operation and the second operation are similar. For example, both the second operation and the third operation are slide operations at the display position of the position selection control. In other embodiments, the second operation and the third operation refer to different operations, the third operation is used for acting on the position selection control and determining the target position from the more than one candidate position, and a type of the third operation may be slide, click, long press, or the like. This embodiment of this application does not limit a specific type and representation of the third operation. For example, when the second operation is slide at the display position of the position selection control, the third operation may be click on any trigger region in the position selection control.

In the presence of a one-to-one corresponding relationship between trigger regions and candidate partitions, the terminal device determines a target partition according to the attribute information of the second operation, that is, the terminal device determines more than one candidate position corresponding to the target trigger region according to the attribute information of the second operation. After the target partition is determined, the user may perform the third operation on the position selection control. The terminal device determines, in response to a user's repeated third operation, the target position in the target partition according to the attribute information of the third operation. In some embodiments, the method of determining the target partition according to the attribute information of the second operation is similar to the method of determining the target position according to the attribute information of the second operation, and the method of determining the target position according to the attribute information of the third operation is also similar to the method of determining the target position according to the attribute information of the second operation, referring to the foregoing embodiments for details.

In this embodiment, the quantity of trigger regions is less than the quantity of target position regions. In this case, the first object can be cast to a large number of candidate positions in the game application interface, and in order to avoid obstructing the screen, the display size of the position selection control is limited. If the terminal device directly establishes a one-to-one corresponding relationship between candidate positions and trigger regions, some trigger regions may be small, making it inconvenient for the user to perform the second operation on the position selection control to select the target position. The trigger region is caused to correspond to more than one candidate position during the second operation, and the target candidate position is determined through the third operation from the more than one candidate position determined by the second operation, whereby sizes of the trigger regions do not need to be changed according to the quantity of the candidate positions, which reduces computations of the terminal device. On the other hand, the user can correctly select the target position through the second operation and the third operation on the position selection control, and the operation of selecting the target position is more convenient and fast.

The above two embodiments introduce the method of determining the target trigger region from the target trigger position of the second operation and determining the target position based on the target trigger region. In other embodiments, the terminal device determines the target position according to motion attributes of the second operation.

The terminal device displays the position selection control on the game application interface in response to the first operation on the first card. In some embodiments, the terminal device determines an initial position from the at least one candidate position, the initial position belonging to the at least one candidate position. Subsequently, the terminal device determines the target position in response to the second operation on the position selection control.

In some embodiments, the terminal device determines the target position in response to the second operation on the position selection control, including: determining the target position when the second operation satisfies a motion condition.

The motion condition indicates that the motion distance in a motion direction is greater than or equal to a distance threshold. In some embodiments, the terminal device detects the motion distance and motion direction of the second operation. When the motion distance of the second operation in a motion direction exceeds the distance threshold, the terminal device determines the target position from the at least one candidate position according to the motion direction of the second operation. For example, the terminal device determines the candidate position pointed by the motion direction of the second operation as the target position. For another example, after determining that the second operation satisfies the motion condition, the terminal device determines the target position from the at least one candidate position according to a first direction. Assuming that at least one candidate position does not overlap on the game application interface, that is, the horizontal (or vertical) coordinate of at least one candidate position does not repeat, the at least one candidate position may be arranged according to the horizontal (or vertical) coordinates of candidate positions (for example, arranged according to the horizontal coordinates of candidate positions from large to small). After the second operation satisfies the motion condition, the target position is determined from the at least one candidate position in descending order of the horizontal coordinates.

In other embodiments, the motion condition indicates that the operation duration of the second operation satisfies a threshold. In some embodiments, the terminal device detects that the operation duration of the second operation satisfies the threshold. If the second operation is a slide operation and the dwell duration of the slide operation at the end position of the operation satisfies the threshold, the end position where the dwell duration satisfies the threshold is determined as the target position. In other embodiments, when a quantity of cards is greater than one, the second operation is a slide operation, the dwell duration at a first position is greater than the threshold after the start position, and the first position is a middle position of the slide operation, the first position is determined as a target position and a card is cast. At this time, the slide operation is not completed, the detected dwell duration at a second position is also greater than the threshold, the second position is a middle position of the slide operation, the second position continues to be determined as a target position and a card is cast, and so on, until all cards are cast. That is, in response to a second operation, a plurality of target positions may be determined and a plurality of cards may be cast. In the technical solution provided in this embodiment of this application, multiple times of card casting is implemented through a second operation, which is beneficial to improving card casting efficiency, increasing card casting difficulty, and increasing card casting fun.

In some embodiments, the second operation is a slide operation in the position selection control. When the position selection control is pressed, that is, the user's finger does not leave the position selection control, the terminal device may determine in real time whether the second operation satisfies the motion condition. When the second operation satisfies the motion condition, the terminal device continuously determines the target position from the candidate positions.

In some embodiments, the terminal device cancels the determination of the target position from the plurality of candidate positions when the second operation satisfies a first condition. In some embodiments, the first condition is that the operation type of the second operation is a first operation type. In some embodiments, the first condition is that the operation end position of the second operation is in a first region. In some embodiments, the first condition is that the operation direction of the second operation is a first direction. In some embodiments, the first condition is a downward slide operation. The terminal device detects a downward slide distance of the second operation to determine whether to cancel the determination of the target position from the plurality of candidate positions. In some embodiments, the terminal device determines, through the attribute information of the second operation, whether the second operation is a downward slide operation. Due to the influence of operation accuracy, downward slide detected by the terminal device during the user's second operation may not necessarily be a slide operation entirely in a −90° direction. Therefore, the downward slide may be a slide operation with a slide angle range of (−90°+e°, −90°−f), where e and f are positive numbers. In some embodiments, the terminal device determines direction information of the second operation according to the attribute information of the second operation. If a value corresponding to the direction information of the second operation is within the slide range, the terminal device determines that the second operation is downward slide. If a value corresponding to the direction information of the second operation is not within the slide range, the terminal device determines that the second operation is not downward slide.

In some embodiments, the terminal device determines coordinate information of the trigger position of the second operation through the attribute information, and compares the coordinate information of the trigger position and the coordinate information of the center point of the position selection control in a position relationship, so as to determine whether to cancel the determination of the target position from the plurality of candidate positions. If the vertical coordinate of the trigger position is less than that of the center point of the position selection control, it indicates that the trigger position of the second operation is below the center point of the position selection control. The terminal device determines, through the foregoing direction information about downward slide, that the second operation is a downward slide operation. In some embodiments, the terminal device cancels the display of the target position determined from the plurality of candidate positions. If the vertical coordinate of the trigger position is greater than or equal to that of the center point of the position selection control, it indicates that the second operation is not a downward slide operation. The terminal device determines the target position corresponding to the second trigger position according to the attribute information of the trigger position of the second operation, and casts the first card to the target position.

Figure 5:
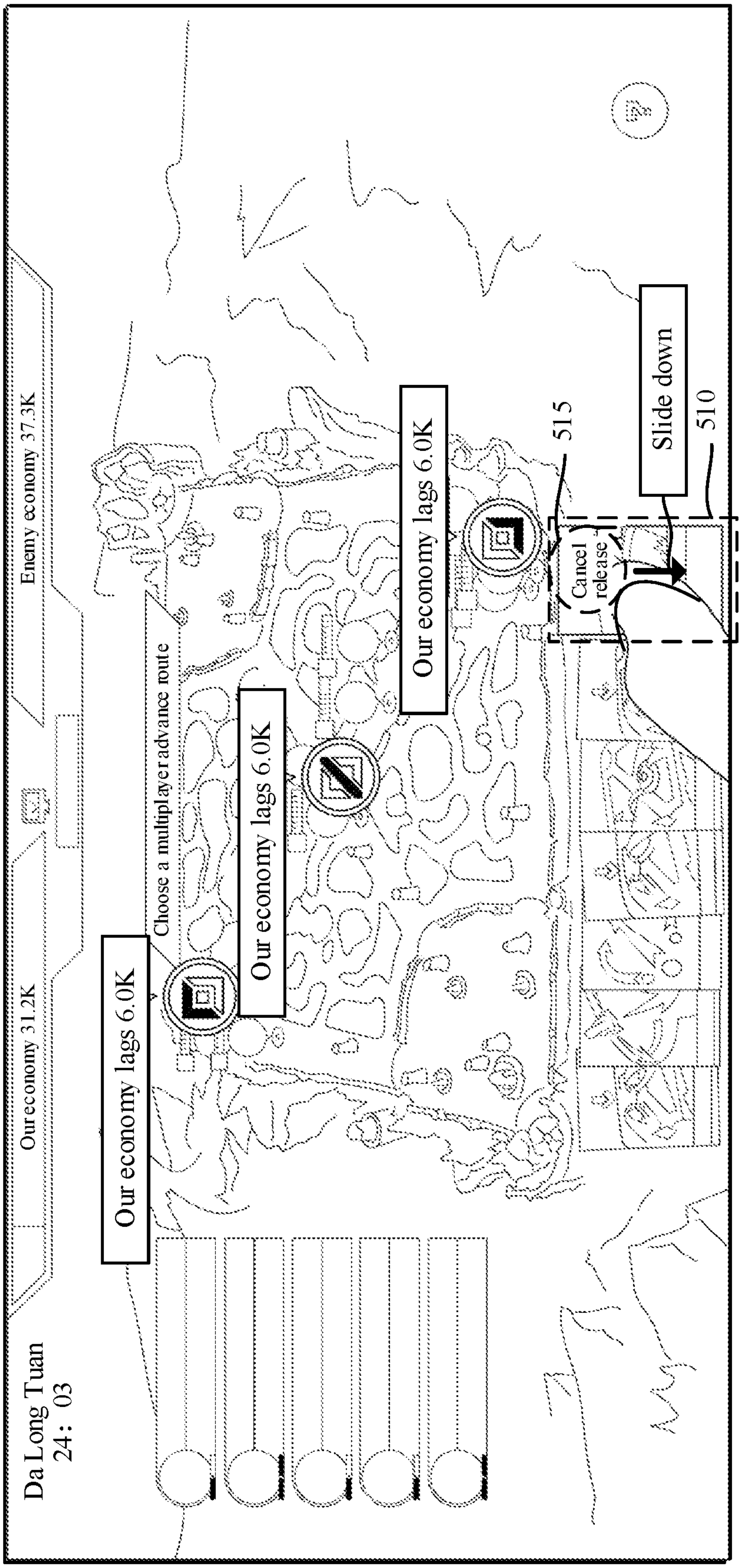
FIG. 5 is a schematic diagram of displaying selection cancel prompt information according to an exemplary embodiment of this application.

In some embodiments, before canceling the determination of the target position from the plurality of candidate positions, the terminal device displays selection cancel prompt information on the game application interface. In some embodiments, the terminal device displays the selection cancel prompt information at the display position of the first card. As shown in FIG. 5, when the attribute information of the second operation satisfies the condition, the terminal device displays selection cancel prompt information 515 at the display position of the first card 510 to prompt the user that the second operation is a selection cancel operation. By displaying the selection cancel prompt information, the user can understand the attribute information of the second operation in time, so as to adjust the direction, range, and the like of the second operation in time.

In some embodiments, the terminal device cancels the display of the position selection control in the case that the second operation satisfies the first condition.

In some embodiments, the terminal device determines a time of canceling the display of the position selection control by determining whether the attribute information of the second operation satisfies the first condition. By canceling the display of the position selection control, the user may cancel the determined target position after the target position is determined through the second operation on the position selection control. When the user changes a strategy in time according to the actual situation in the game application interface, the second operation can be changed in time with the change of the user's strategy, whereby the flexibility of the second operation is improved.

In the technical solution provided in this embodiment of this application, in the case that the second operation satisfies the first condition, canceling the determination of the target position from the plurality of candidate positions may effectively avoid a situation of accidental touch, or a situation where the card caster desires to cancel casting in the casting process, thereby effectively avoiding resource waste and further making the casting of cards more flexible and humane.

The following introduces and explains the method for determining the display position of the position selection control.

In some embodiments, the terminal device displays the position selection control, including: the terminal device determines the display position of the position selection control based on the display position of the first card; and the terminal device displays the position selection control at the display position of the position selection control.

Before displaying the position selection control, the terminal device needs to determine the display position of the first card. In some embodiments, the terminal device may determine the display position of the first card according to the first operation on the first card. For example, the first operation on the first card is a long press operation, and the terminal device may determine the display position of the first card according to the trigger position of the long press operation. In other embodiments, the terminal device determines the display position of the first card by retrieving display data of the first card. For example, the display data of the first card includes display coordinates of a center point of the first card. The terminal device may determine the display position of the first card according to the display coordinates of the first card and the display size of the first card. The display position of the first card may be coordinates of any display point of the first card, for example, the display position of the first card refers to the display position of the first card at the center point. Alternatively, the display position of the first card may be a display range of the first card in the game application interface, that is, the display position of the first card includes coordinates corresponding to a plurality of display points in the first card.

In some embodiments, the first operation and the second operation are continuous operations. The continuous operations indicate that the user's finger does not leave the screen between the first operation and the second operation. If the user's finger leaves the screen, the first operation and the second operation can act simultaneously by using a first button to perform the first operation and the second operation simultaneously or sequentially, and the first operation and the second operation may also be considered as continuous operations. The user's finger does not need to leave the screen, so that the first operation and the second operation can be performed more smoothly. After the first operation, the user can directly perform the second operation without changing the position of the finger in contact with the screen or by sliding the finger to the position selection control. In some embodiments, the terminal device may display the position selection control at the display position of the first card, so that the user can immediately operate the position selection control after the first operation. Through the foregoing method, the user directly moves (or does not move) the finger to the position selection control by referring to the finger contact point of the first operation, thereby reducing the difficulty of switching from the first operation to the second operation and improving the accuracy of the second operation.

In some embodiments, by controlling the distance between the display position of the position selection control and the display position of the first card to be less than or equal to a first threshold, the operation interval between the first operation and the second operation may be reduced, and the necessity for the finger to leave the screen between the first operation and the second operation may be reduced, so that the first operation and the second operation become continuous operations. After determining the display position of the first card, the terminal device determines the display position of the position selection control based on the display position of the first card. In some embodiments, the terminal device determines the display position of the position selection control based on the display position of the first card and the first threshold. For example, the display position of the first card refers to display coordinates $(x_0, y_0)$ of the center point of the first card, the first threshold is 20 pixels, and an optional region of the display position of the position selection control, determined by the terminal device according to the display position of the first card and the first threshold, is $(x-x_0)^2+(y-y_0)^2=400$. In some embodiments, (x, y) is the display coordinates of the center point of the position selection control. The first threshold may be preconfigured. A specific value of the first threshold is determined according to the specific methods of the first operation and the second operation, and is not limited here in this application. Specifically, the value of the first threshold is equal to 0, that is, the terminal device displays the position selection control on the display position of the first object in response to the first operation.

Figure 6:
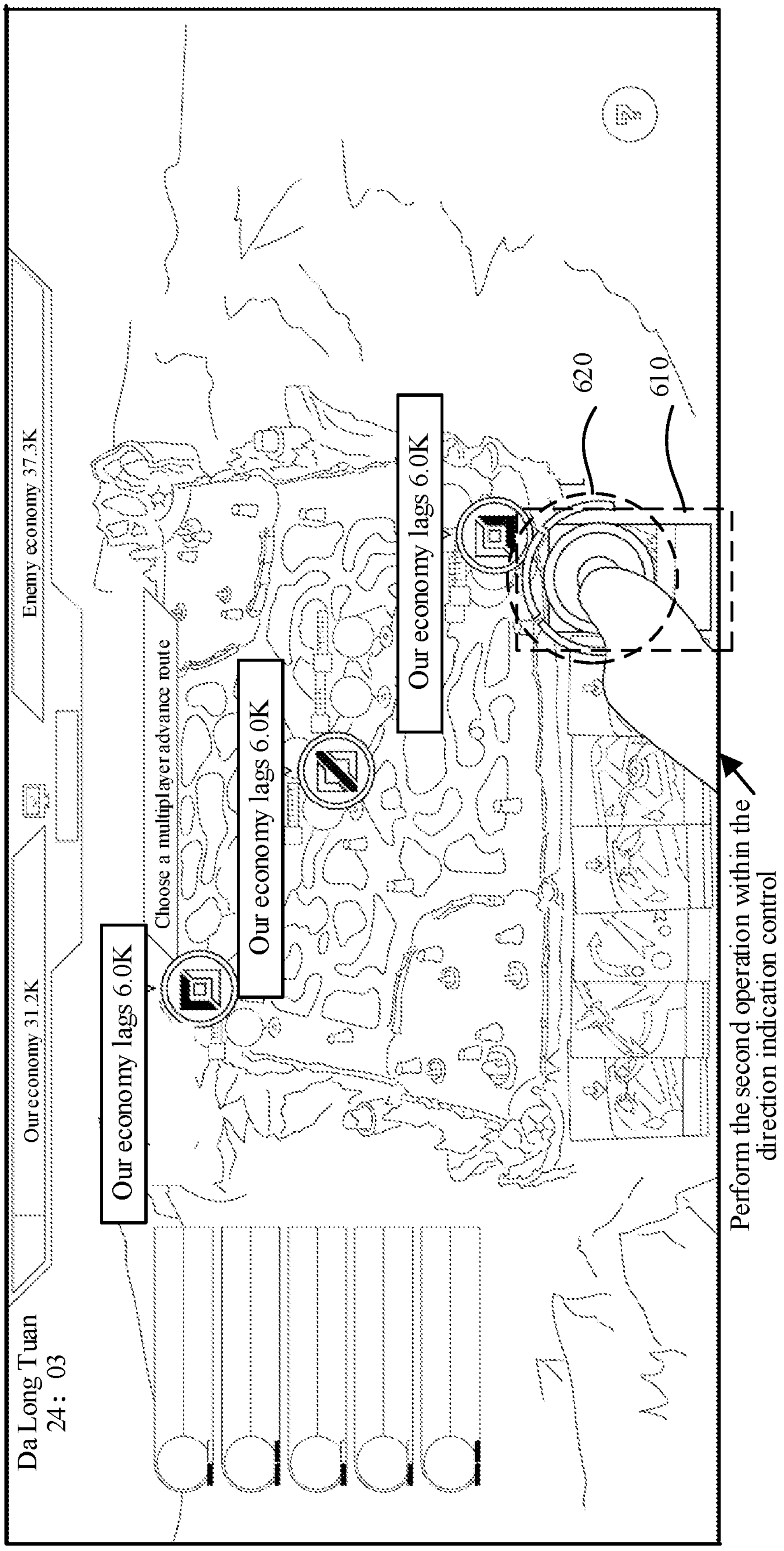
FIG. 6 is a schematic diagram of a display position of a position selection control according to an exemplary embodiment of this application.
Figure 7:
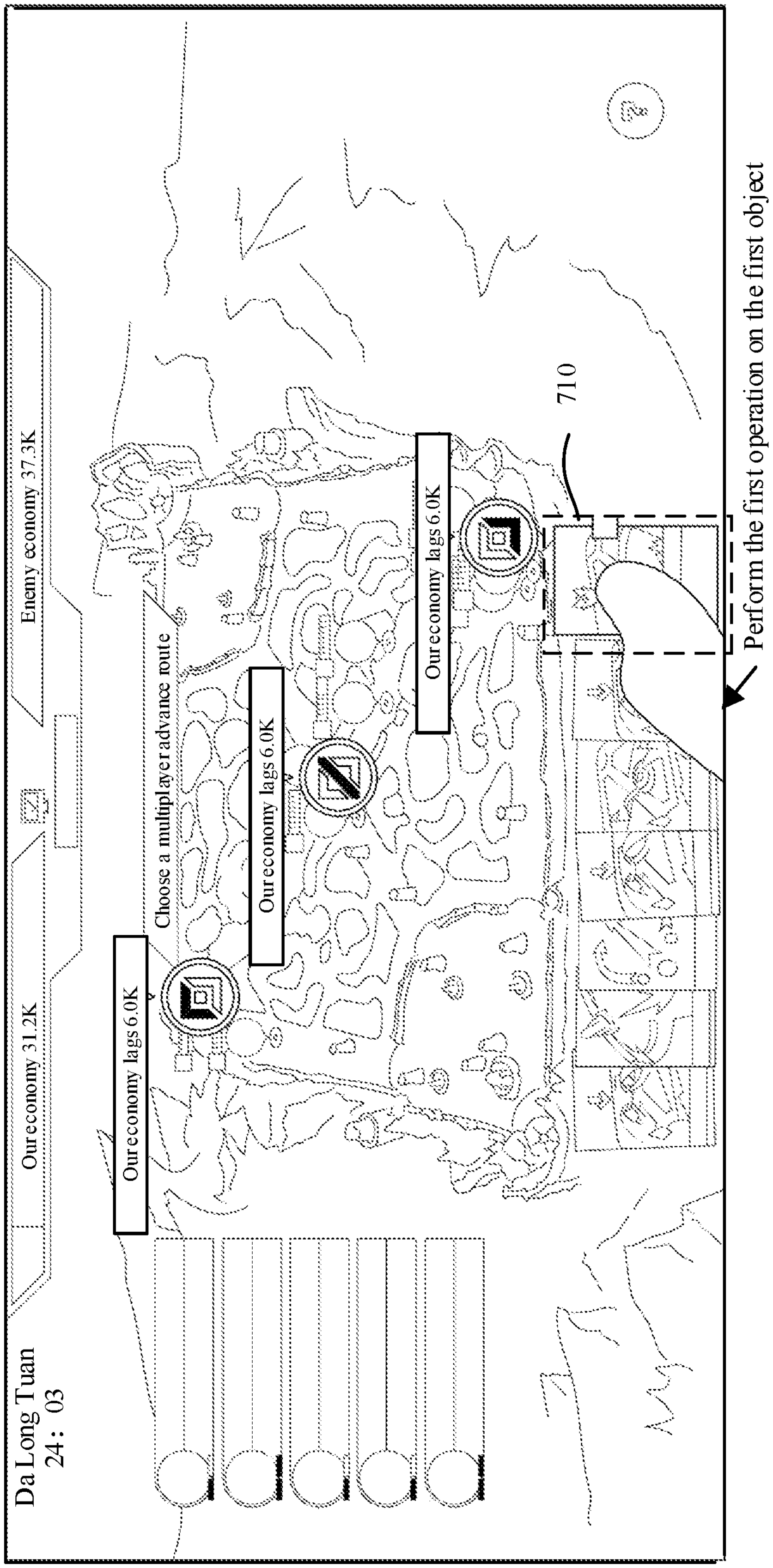
FIG. 7 is a schematic diagram of an operation method of a first operation according to an exemplary embodiment of this application.

FIG. 6 shows a display position of a position selection control. In some embodiments, the display position of the position selection control 620 does not exceed the display position of the first card 610. For example, the position selection control 620 is displayed on an upper layer of the first card 610. In some embodiments, the terminal device displays the position selection control 620 within a range less than the first threshold from the display position of the first card 610 in response to the first operation on the first card 610. For example, the first operation is a long press operation, as shown in FIG. 7, which shows an operation method of a first operation. The first object 710 may be selected by the long press operation at the display position of the first object 710. The second operation is a slide operation. The terminal displays the position selection control at the distance less than the first threshold from the display position of the first card in response to the user's long press operation on the first card. In this case, the user may perform a slide operation on the position selection control without moving the finger or by slightly moving the finger.

By controlling the distance between the display position of the position selection control and the display position of the first card to be less than or equal to the first threshold, the user can perform the second operation on the position selection control without a great change in the operation position (event in the trigger position of the first operation) after the first operation on the first card, whereby the continuity between the first operation and the second operation is increased, and the operation steps of the card casting method are simplified. On the other hand, blockage of the position selection control displayed on the game application interface on other display information in the game application interface is reduced, and omission of important game information caused by displaying the position selection control on the game application interface and by blocking other display information in the game application interface due to user's second operation on the position selection control is avoided.

In other embodiments, the first operation and the second operation are discontinuous operations. The discontinuous operations indicate that the user's finger leaves the screen between the first operation and the second operation. In some embodiments, in this case, the user may use both hands to perform the first operation and the second operation separately, for example, use the left hand to perform the first operation and use the right hand to perform the second operation, so that the first operation and the second operation are discontinuous operations to increase operation rhythms. In addition, in the case that both hands are used to perform the first operation and the second operation separately, both hands of the user can participate in the card casting process, which improves operation comfort. In some embodiments, the terminal device controls the distance between the display position of the position selection control and the display position of the first card to be greater than or equal to a second threshold, so that the first operation and the second operation are discontinuous operations.

Figure 8:
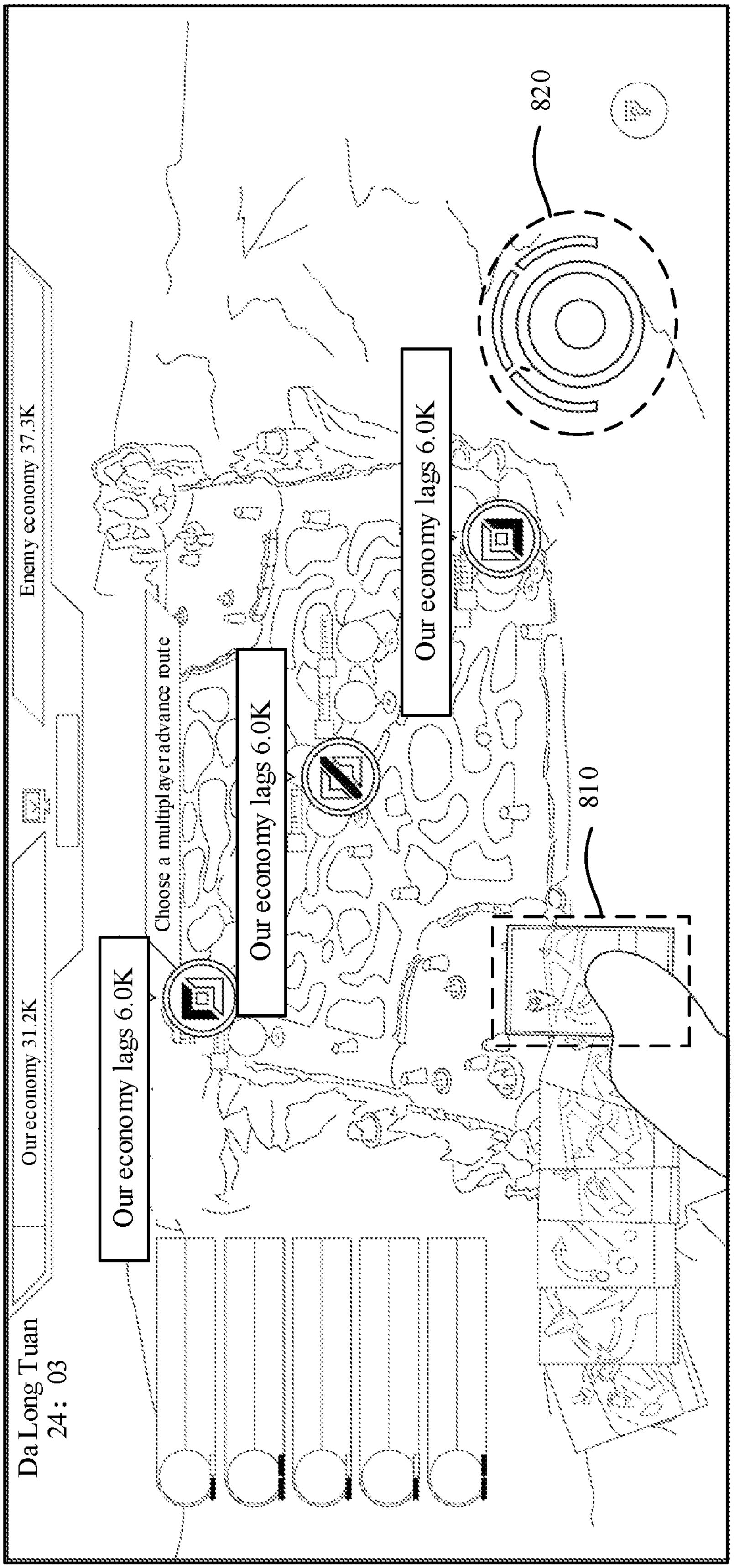
FIG. 8 is a schematic diagram of a display position of a position selection control according to another exemplary embodiment of this application.

In some embodiments, the second threshold is greater than or equal to the first threshold. FIG. 8 shows a display position of another position selection control. In some embodiments, the first card 810 is displayed on one side of the game application interface, and the position selection control 820 is displayed on the other side of the game application interface. As shown in FIG. 8, the first card 810 is displayed on the left side of the game application interface, and the position selection control 820 is displayed on the right side of the game application interface. This prevents the display of the position selection control in the game application interface from blocking other information displayed in the game application interface and the first card. Before the user completes the second operation, whether to cast the first card may be confirmed according to the attribute information of the first card displayed in the game application interface. This avoids mistaken selection of other cards displayed in the game application interface due to errors of the first operation on the first card. Moreover, in this embodiment, the first operation on the first card and the second operation on the position selection control may be implemented with both hands, thereby improving operation comfort.

Figure 9:
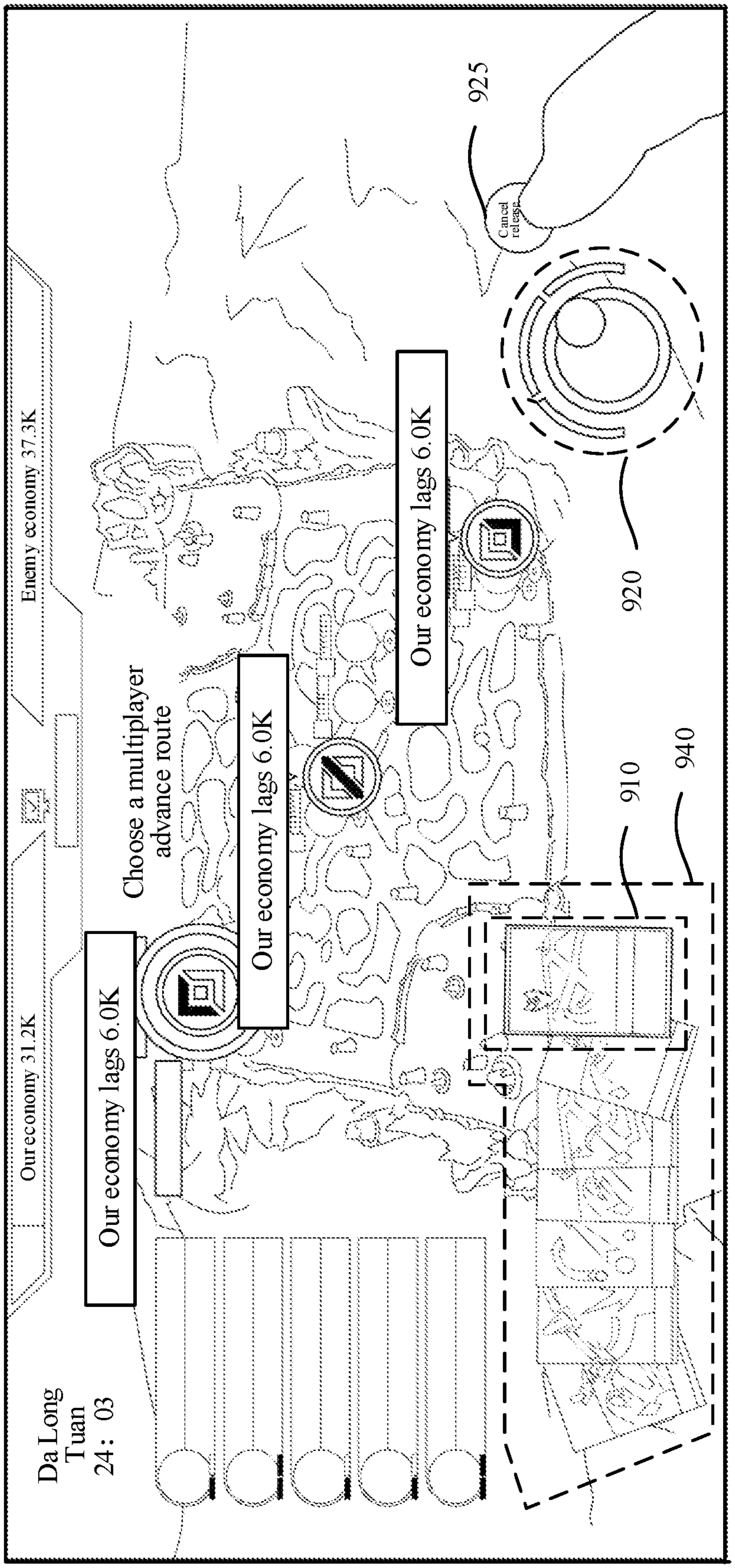
FIG. 9 is a schematic diagram of displaying a selection cancel control according to an exemplary embodiment of this application.

In some embodiments, when the second operation satisfies a display condition, the terminal device displays a selection cancel control on the user display interface. As shown in FIG. 9, after recognizing that the second operation satisfies the display condition, the terminal device displays the selection cancel control 925 at the upper right corner of the position selection control 920. After the user slides from the position selection control 920 to the selection cancel control 925, the terminal device cancels the first card 910 selected from a plurality of candidate cards 940.

In the technical solution provided in this embodiment of this application, the first operation and the second operation are divided into continuous operations or discontinuous operations, which enriches operation forms and further enriches card casting forms, making card casting more flexible and diverse.

The following introduces and explains methods for improving correctness of the first operation and the second operation. In some embodiments, the position selection control displays a plurality of indicator elements, and the plurality of indicator elements correspond to the plurality of candidate positions one to one; and the method further includes: differentially displaying, by the terminal device, a target indicator element corresponding to the target position among the plurality of indicator elements from other indicator elements among the plurality of indicator elements except for the target indicator element.

Figure 10:
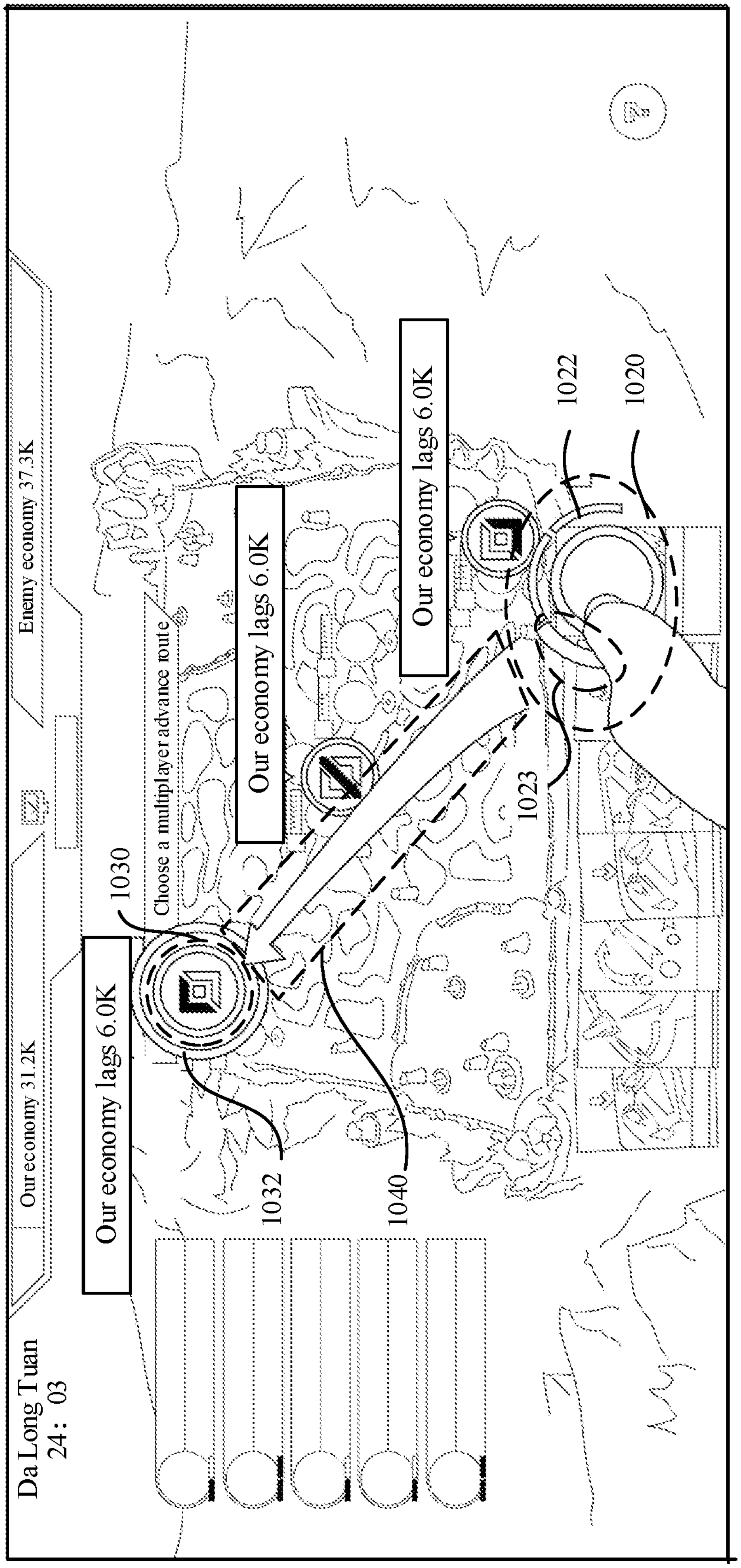
FIG. 10 is a schematic diagram of a display method for indicator elements according to an exemplary embodiment of this application.

The indicator element is used for indicating a target trigger region in the position selection control. In some embodiments, the plurality of indicator elements may be displayed at an edge of the position selection control or at a central position of the position selection control. FIG. 10 shows a display method for indicator elements. The indicator element 1022 is displayed at the edge of the position selection control 1020. In some embodiments, due to the one-to-one correspondence between the plurality of trigger regions and the plurality of candidate positions, and the one-to-one correspondence between the plurality of indicator elements and the plurality of candidate positions, the plurality of trigger regions and the plurality of indicator elements also correspond one to one. In some embodiments, when the trigger position of the second operation belongs to a trigger region, the trigger region is a target trigger region, the corresponding candidate position is a target position, and the indicator element corresponding to the target position is a target indicator element. For example, indicator element 1 corresponds to candidate position a, trigger region 1 corresponds to candidate position a, and there is a corresponding relationship between indicator element 1 and trigger region 2.

The terminal device differentially displays the target indicator elements from other indicator elements. The differential display method includes but is not limited to text differential display, color differential display, brightness differential display, pattern differential display, and cartoon differential display. FIG. 10 shows a display method for indicator elements, where a display size of the target indicator element 1023 in the position selection control 1020 is different from that of another indicator element 1022.

In some cases, during the second operation on the target selection control, the user's finger may block some content in the target selection control. By displaying the plurality of indicator elements corresponding to the trigger regions one to one in the position selection control and differentially displaying other indicator elements except for the target indicator element, the user can determine the target trigger region and target position of the second operation through the differentially displayed target indicator element. In some embodiments, the indicator elements corresponding to the trigger regions are displayed above the trigger regions. The differential display of the target indicator element may provide a direction indication for adjusting the trigger position of the second operation. For example, the position selection control includes 3 trigger regions (trigger region 1, trigger region 2, and trigger region 3) and 3 indicator elements (indicator element 1, indicator element 2, and indicator element 3), the 3 trigger regions are arranged in sequence from left to right, and the indicator elements are displayed above the corresponding trigger regions. When the trigger position of the second operation belongs to trigger region 2, the terminal device differentially displays indicator element 2, for example, the terminal device increases the display brightness of indicator element 2. If the user desires the selected target position to be on the left side of the candidate position corresponding to trigger region 2, the user may move the finger to the left according to the differentially displayed indicator element 2, so that the trigger position of the second operation belongs to trigger region 1. The terminal device differentially displays indicator element 1 based on the adjusted second operation, and cancels the differential display of indicator element 2, so that the adjusted second operation can select the user desired target position. By displaying the plurality of indicator elements in the position selection control, indication information may be provided when the user performs the second operation on the position selection control to assist the user in recognizing the target trigger region corresponding to the second operation and recognizing the target position. In addition, the terminal device can differentially display the target indicator element at the trigger position of the user's second operation on the position selection control, which enhances user's sense of interaction during the second operation.

In some embodiments, the terminal device displays prompt information in the game application interface, the prompt information being used for prompting the target position determined by the second operation. In some embodiments, a display form of the prompt information includes but is not limited to: changing the display form of the target position and differentially displaying the target position; displaying corresponding schematic information between the first card and the target position on the game application interface, such as a prompt icon; and displaying a prompt text, an icon, or the like.

In some embodiments, after the terminal device determines the target position from the plurality of candidate positions, the method further includes: differentially displaying the target position from other candidate positions among the plurality of candidate positions except for the target position.

The method for differentially displaying the target position from other candidate positions includes but is not limited to: differentially displaying colors, brightness, pictures, and texts. The differential display method is determined according to an actual situation, and is not limited here in this application. As shown in FIG. 10, the terminal device displays a ring mark 1032 on the periphery of the target position 1030 to implement differential display of the target position and other candidate positions among the plurality of candidate positions except for the target position.

In some embodiments, in order to enhance the prompt effect of the prompt information, the prompt information may be an icon pointing from the first card to the target position, for example, the prompt information is a parabolic line, an arrow mark, or the like pointing from the first card to the target position. As shown in FIG. 10, a display form of the prompt information 1040 is an arrow pointing from the first card to the target position.

Figure 11A:
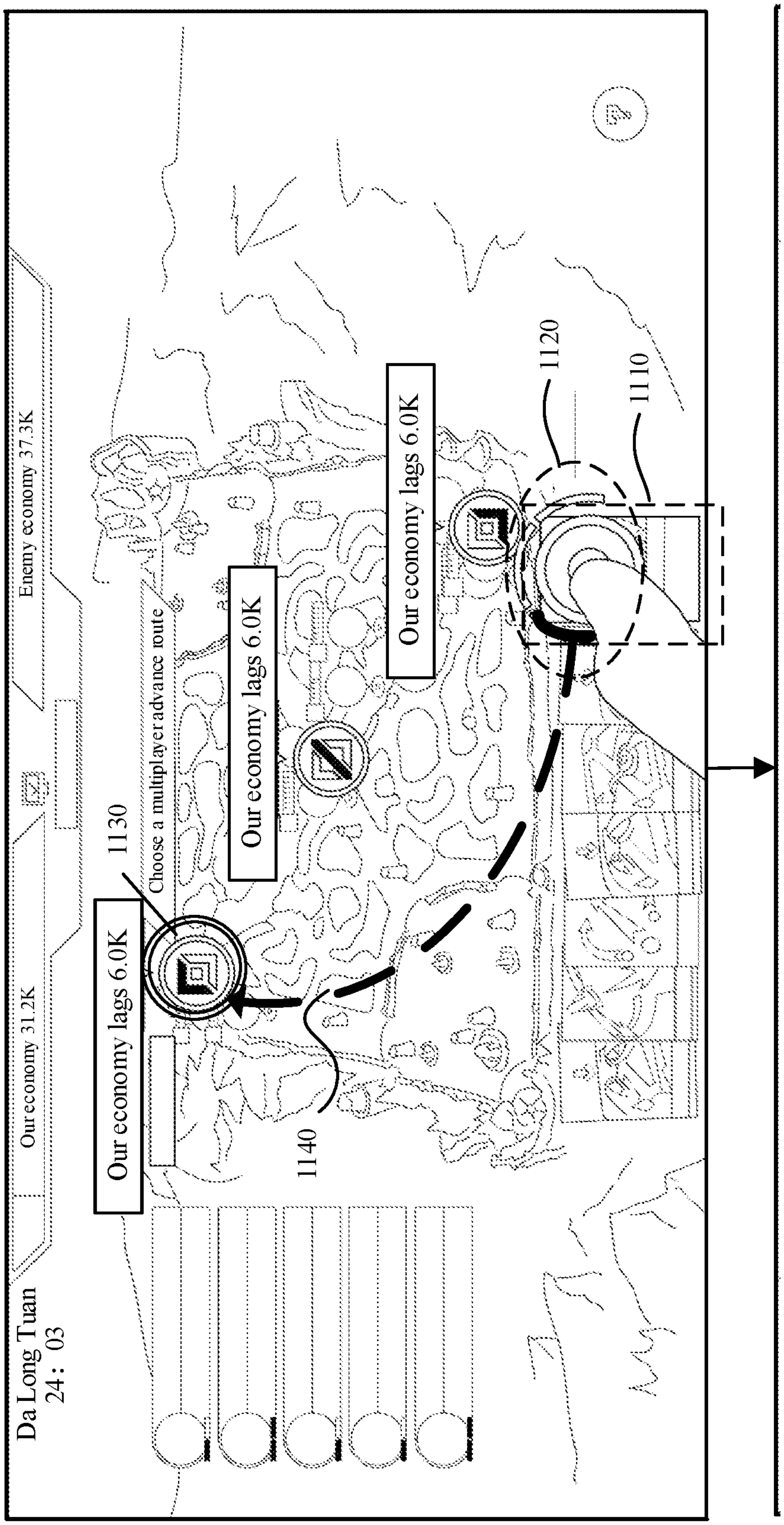
FIGS. 11A and 11B are schematic diagrams of a display method for prompt information according to an exemplary embodiment of this application.
Figure 11B:
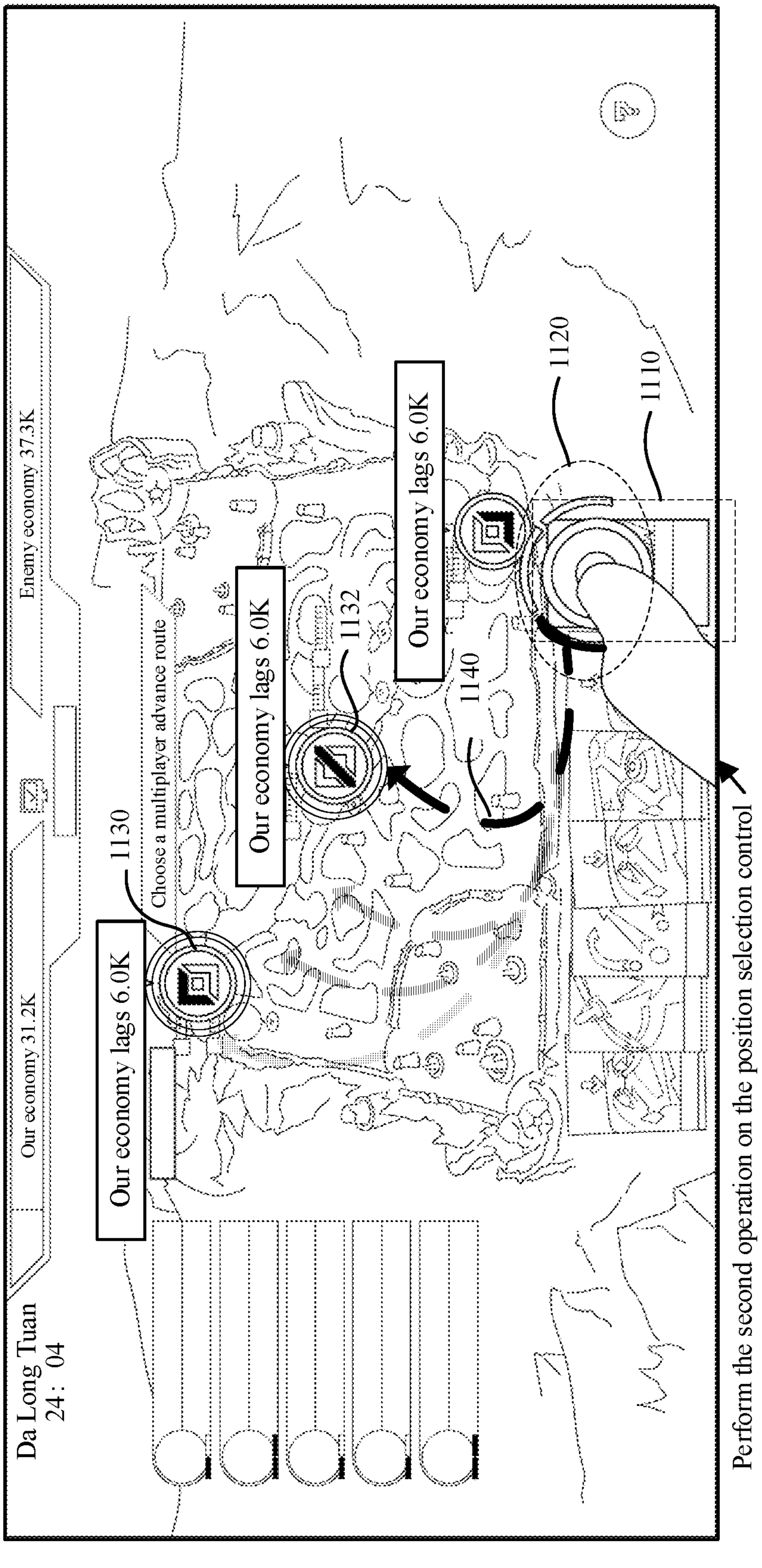

In some embodiments, the prompt information changes with the second operation. As shown in FIG. 11A, after the first object 1110 is selected, the target region corresponding to the second operation is trigger region 1, and the corresponding target position is first candidate position 1130. The user moves the finger in the position selection control 1120 to change the target region corresponding to the second operation into trigger region 3, and the corresponding target position becomes third candidate position 1132. As shown in FIG. 11B, when the user changes the target region through the second operation, indication information 1140 may change in real time with the target position. In other embodiments, the prompt information does not change with the second operation, and the terminal device displays the prompt information on the game application interface after determining the target position through the second operation.

Figure 12:
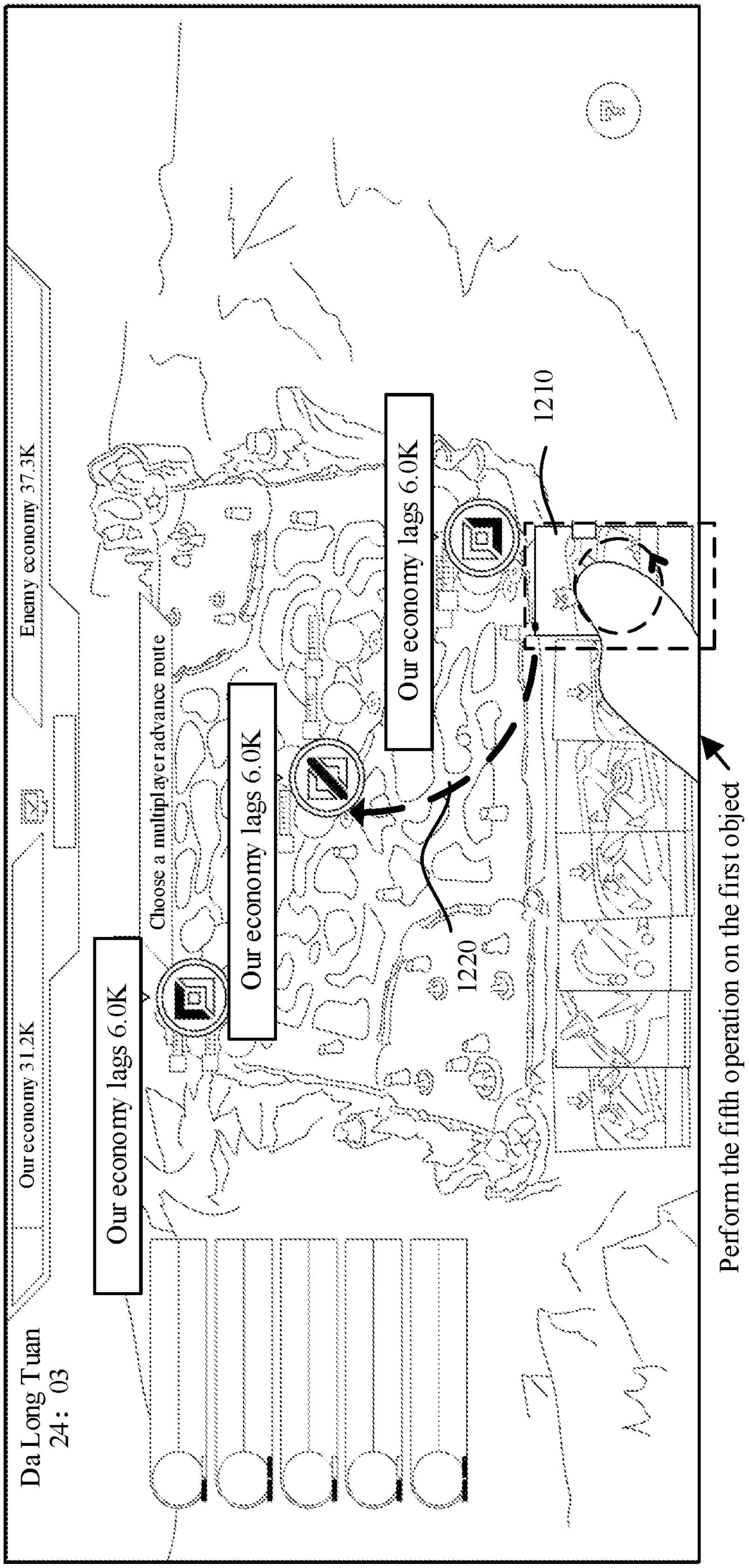
FIG. 12 is a schematic diagram of a display method for a mapping indicator line according to an exemplary embodiment of this application.

In some embodiments, a mapping indicator line is displayed in the game application interface in response to the first operation on the first card. As shown in FIG. 12, the terminal device displays the mapping indicator line 1220 in the game application interface in response to the first operation on the first card 1210. In some embodiments, the terminal device changes the candidate position pointed by the mapping indicator line in response to a fifth operation on the first card. The fifth operation on the first card is used for changing the trigger position of the second operation in a small range in the display position of the first card, for example, the finger slides in a small range in the display position of the first card. In some embodiments, after the second operation exceeds the display range of the first card, the terminal device cancels the determination of the target position from the plurality of candidate positions.

This embodiment provides a method of using a mapping indicator line instead of the position selection control, whereby the display of the mapping indicator line in the game application interface causes little blockage to the game application interface. Therefore, the use of the prompt information to prompt the target position determined by the second operation may clearly and intuitively indicate the user's target position, reduce the occurrence of card casting errors, further reduce the operation difficulty, and reduce unnecessary processing overhead caused by multiple incorrect operations of the device.

In some embodiments, after the terminal device determines the target position from the plurality of candidate positions, the method further includes: displaying the position selection control in response to a fourth operation on a second card displayed in the game application interface, the target position being in a selected state.

In some embodiments, the fourth operation acts on the second card and is used for displaying the position selection control, and the fourth operation includes but is not limited to click, long press, and slide operations. A specific type and representation of the fourth operation are not limited in this application. The fourth operation and the first operation may be of the same type or different types.

In some embodiments, the second card refers to a display card that is displayed in the game application interface and can be cast to at least one candidate position corresponding to the first card. After selecting the target position, the user can replace the card to be cast to the target position. If the user only needs to replace, but not change the first card, the user may directly select the second card through the fourth operation on the second card and determine the target position corresponding to the first card as a target position corresponding to the second card. Further, the user may cast the second card to the target position without reselecting the same target position after selecting the second card.

In some embodiments, after the terminal device determines the target position corresponding to the first card from the at least one candidate position, the terminal device displays the position selection control in response to the fourth operation on the second card, and in some embodiments, a display position of the position selection control may be determined according to the display position of the second card, where reference may be made to the foregoing embodiment for the specific method. In some embodiments, when the target position is in a selected state, the terminal device casts the second card to the target position in response to a sixth operation on the second card. In some embodiments, the terminal device re-determines the target position corresponding to the second card from the at least one candidate position in response to a seventh operation on the position selection control. In some embodiments, the seventh operation acts on the second card and is used for displaying the position selection control, and the seventh operation includes but is not limited to click, long press, and slide operations. A specific type and representation of the seventh operation are not limited in this application. In some embodiments, the target position determined through the seventh operation on the position selection control may be the same as or different from the target position selected through the fourth operation on the second card. In some embodiments, the second operation and the seventh operation on the position selection control are of the same type. In response to the fourth operation on the second card, steps of re-selecting a target position are reduced, and redundant steps in the process of casting a target card (the target card is the first card or the second card after the fourth operation) are reduced, so that the process of casting the target card is more concise.

Figure 13:
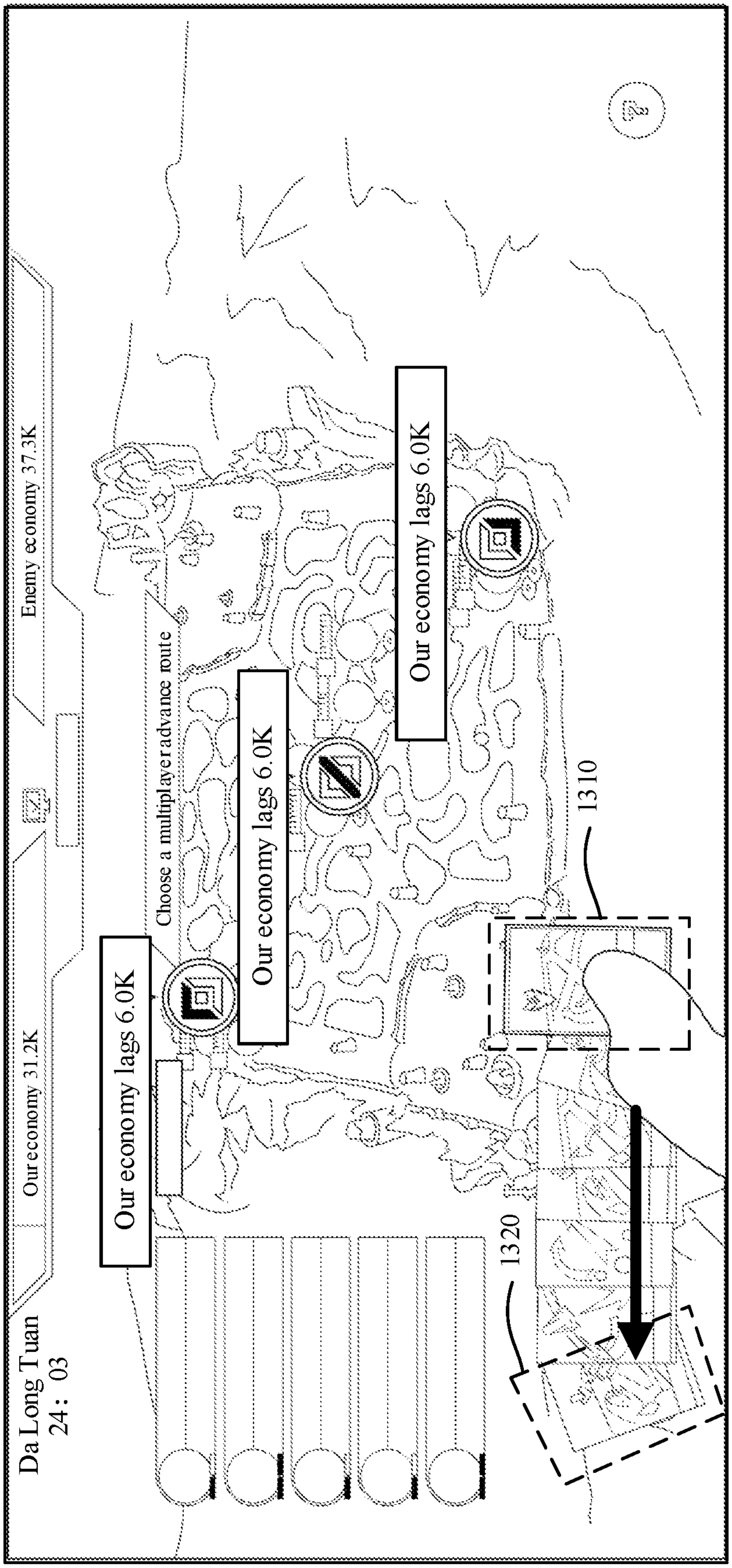
FIG. 13 is a schematic diagram of an operation method of a third operation according to an exemplary embodiment of this application.

FIG. 13 shows a schematic diagram of a fourth operation on a second card. The fourth operation may be a slide operation from the first card 1310 to the second card 1320, a long press operation on the second card 1320, or the like.

In some embodiments, after displaying the position selection control, the method further includes: using, by the terminal device, a recommended candidate position among the plurality of candidate positions as an initialized target position, where the recommended candidate position is a candidate position that is determined from the plurality of candidate positions and that satisfies a second condition in terms of fitness with the first card.

In some embodiments, the second condition refers to a maximum score of fitness. In some embodiments, for the plurality of candidate positions, scores of fitness with the first card are determined respectively according to the attribute information of the first card, and the candidate position corresponding to the maximum score of the plurality of scores of fitness is determined as the recommended candidate position. The scores of fitness may be determined based on some score determination models such as a neural network model, which are not limited in this application. The attribute information of the first card includes but is not limited to attribute information of a first card casting object and attribute information of a user account that casts the card.

In some embodiments, the fitness of a candidate position is related to an attribute of the first card. In some embodiments, the attribute of the first card refers to the influence of the first card on other display content in the game application interface. For example, the first card is a card, the attribute of the first card is attack, and the terminal device determines, according to the attribute of the first card, the candidate position suitable for attack in the game application interface as the initialized target position.

In some embodiments, the terminal device records user's operating habits and determines the initialized target position from the at least one candidate position according to the user's operating habits. For example, if the user is accustomed to casting the first card to left candidate positions in the game application interface, the terminal device determines any of the left candidate positions in the game application interface as the initialized target position.

In the technical solution provided in this embodiment of this application, the position having the fitness with the first card that satisfies the second condition among the plurality of candidate positions is determined as the initialized target position, that is, different target positions may be determined by setting different conditions. The target position obtained based on the fitness that satisfies the second condition can better meet user's requirements, reduce subsequent changes in the target position, save processing overhead, and reduce operation difficulty.

Figure 14:
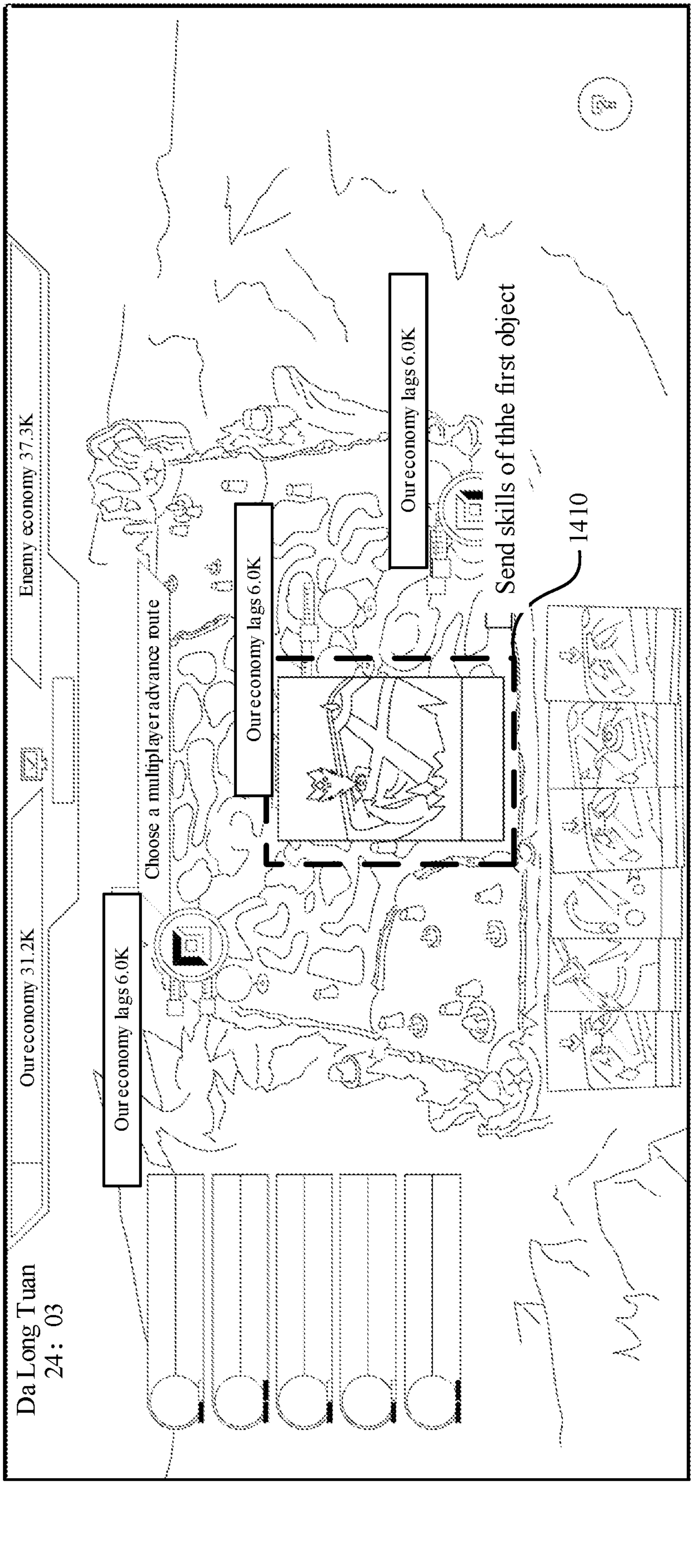
FIG. 14 is a schematic diagram of a display method for a first card according to an exemplary embodiment of this application.

As shown in FIG. 14, before moving the first card to the target position, the terminal device displays the first card 1410 in the game application interface.

The foregoing embodiments about the methods for determining the target position, determining the display position of the position selection control, and improving the correctness of the first operation and the second operation may be freely combined.

Figure 15:
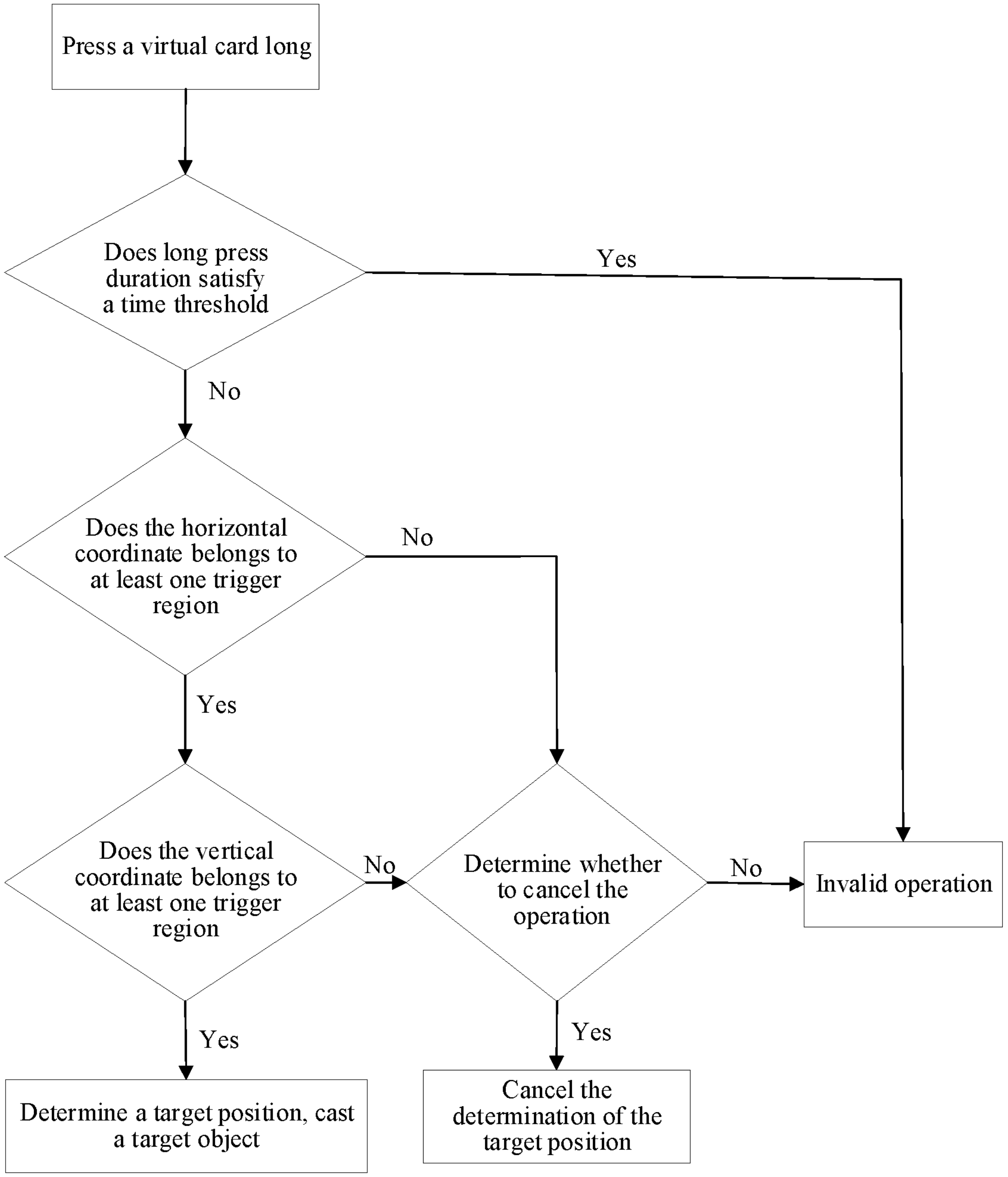
FIG. 15 is a schematic diagram of a card casting method according to an exemplary embodiment of this application.

FIG. 15 shows a schematic diagram of a card casting method according to an embodiment of this application.

The terminal device determines, in response to a long press operation (the first operation) on a card, whether long press duration satisfies a time threshold. When the long press duration is less than the time threshold, the terminal device determines that the long press operation is invalid. When the long press duration is greater than or equal to the time threshold, the terminal device determines whether the horizontal coordinate (vertical coordinate) of the trigger position belongs to at least one candidate region. If the horizontal coordinate (vertical coordinate) of the trigger position does not belong to at least one candidate region, the terminal device determines whether the second operation is cancel. If the second operation is a cancel operation, the terminal device cancels the determination of a target position. If the second operation is not a cancel operation, the terminal device determines that the current operation is invalid. If the horizontal coordinate and vertical coordinate of the trigger position both belong to at least one candidate region, the terminal device determines a target position corresponding to the card and casts the card to the target position.

The card casting method introduced in the forgoing embodiments may alternatively be used as an object casting method, that is, the first card may alternatively be a first object. The first object refers to a display object (such as an application icon) displayed on the user interface, and the display position of the display object may be manually changed. The object casting method may be applied in a scene where an application icon is cast to a target position in a user interface, so as to solve inconvenient operations caused by dragging and casting the application icon to the target position, improve the speed of the casting operation, and reduce blockage of the casting operation on the interface. The application icon is only used as an example of the first object, and this method may alternatively be applied in other scenes where an object is cast to a target position.

The following describes apparatus embodiments of this application, which may be used for performing the method embodiments of this application. For details not disclosed in the apparatus embodiments of this application, refer to the method embodiments of this application.

Figure 16:
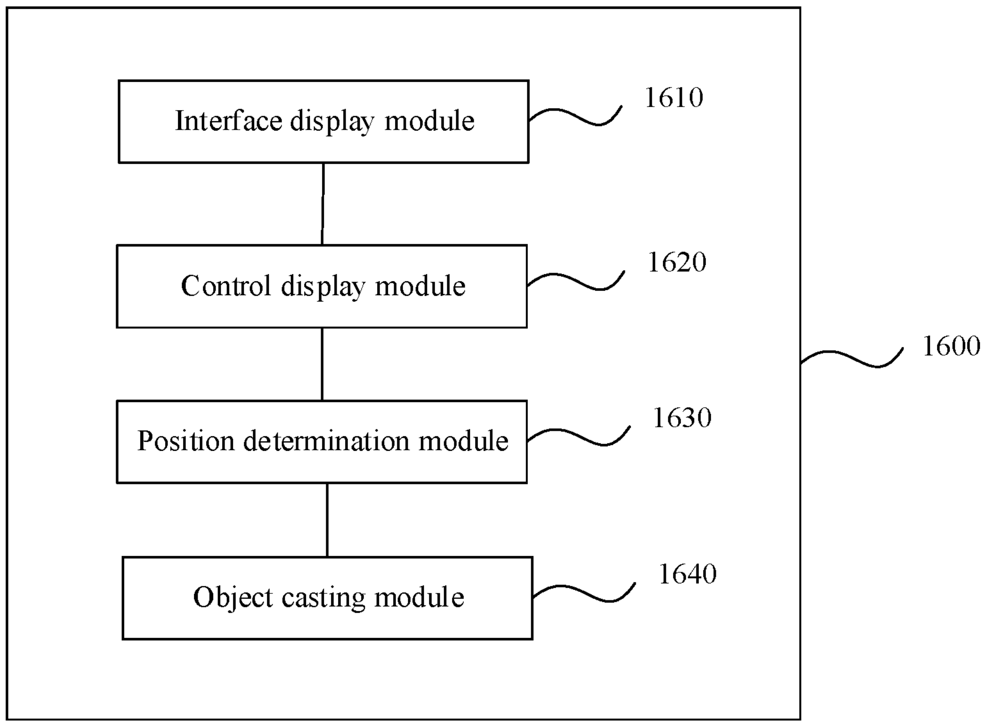
FIG. 16 is a block diagram of a card casting apparatus according to an exemplary embodiment of this application.

FIG. 16 shows a block diagram of a card casting apparatus according to an exemplary embodiment of this application. The apparatus may be implemented as all or a part of a terminal device by software, hardware, or a combination of the two. The apparatus 1600 may include: an interface display module 1610, a control display module 1620, a position determination module 1630, and a card casting module 1640.

The interface display module 1610 is configured to display a game application interface, the game application interface displaying a first card and a plurality of candidate positions corresponding to the first card.

The control display module 1620 is configured to display a position selection control in response to a first operation on the first card.

The position determination module 1630 is configured to determine a target position from the plurality of candidate positions in response to a second operation on the position selection control.

The card casting module 1640 is configured to cast the first card to the target position.

In some embodiments, the position determination module 1630 includes: a region determination unit, configured to determine a target trigger region matching attribute information of the second operation from a plurality of trigger regions corresponding to the position selection control; and a position determination unit, configured to determine a candidate position corresponding to the target trigger region among the plurality of candidate positions as the target position.

In some embodiments, the region determination unit is configured to determine coordinate information of a trigger position of the second operation based on the attribute information of the second operation, the coordinate information including a horizontal coordinate and a vertical coordinate of the trigger position; determine a first set of trigger regions from the plurality of trigger regions according to the horizontal coordinate of the trigger position, where each trigger region in the first set of trigger regions has at least one position with the same horizontal coordinate as the trigger position; determine a second set of trigger regions from the plurality of trigger regions according to the vertical coordinate of the trigger position, where each trigger region in the second set of trigger regions has at least one position with the same vertical coordinate as the trigger position; and determine an intersection of the first set of trigger regions and the second set of trigger regions as the target trigger region.

In some embodiments, the position determination unit is configured to, in a case of more than one candidate position corresponding to the target trigger region, in response to a third operation on the position selection control, determine the target position from the more than one candidate position according to attribute information of the third operation.

In some embodiments, the position selection control displays a plurality of indicator elements, the plurality of indicator elements correspond to the plurality of candidate positions one to one, and the control display module 1620 is further configured to: differentially display a target indicator element corresponding to the target position among the plurality of indicator elements from other indicator elements among the plurality of indicator elements except for the target indicator element.

In some embodiments, the control display module 1620 is configured to determine a display position of the position selection control based on a display position of the first card; and display the position selection control at the display position of the position selection control.

In some embodiments, the apparatus 1600 further includes: a differential display module, configured to differentially display the target position from other candidate positions among the plurality of candidate positions except for the target position.

In some embodiments, the first operation and the second operation are continuous operations; or the first operation and the second operation are discontinuous operations.

In some embodiments, the interface display module 1610 is further configured to: cancel the determination of the target position from the plurality of candidate positions when the second operation satisfies a first condition.

In some embodiments, the control display module 1620 is further configured to display the position selection control in response to a fourth operation on a second card displayed in the game application interface after the target position is determined from the plurality of candidate positions, the target position being in a selected state.

In some embodiments, the apparatus 1600 further includes: an initial position display module, configured to use a recommended candidate position among the plurality of candidate positions as an initialized target position, where the recommended candidate position as an initial position refers to at least one candidate position corresponding to the first card that is determined from the plurality of candidate positions and that satisfies a first numerical value and a second condition in terms of fitness with the first card.

In some embodiments, the game application interface further displays a three-dimensional game scene, and the plurality of candidate positions corresponding to the first card are located in the three-dimensional game scene.

When the functions of the apparatus provided in the foregoing embodiment are implemented, only division of the foregoing functional modules is used as an example for description. In practical applications, the functions may be allocated to and completed by different functional modules according to requirements. That is, an internal structure of the apparatus is divided into different functional modules, to complete all or some of the functions described above. In addition, the apparatus provided in the foregoing embodiments and the method embodiments fall within a same conception. For details of a specific implementation process, refer to the method embodiments. Details are not described herein again. For beneficial effects of the apparatus provided in the foregoing embodiments, refer to the descriptions of the method embodiments. Details are also not described herein again.

Figure 17:
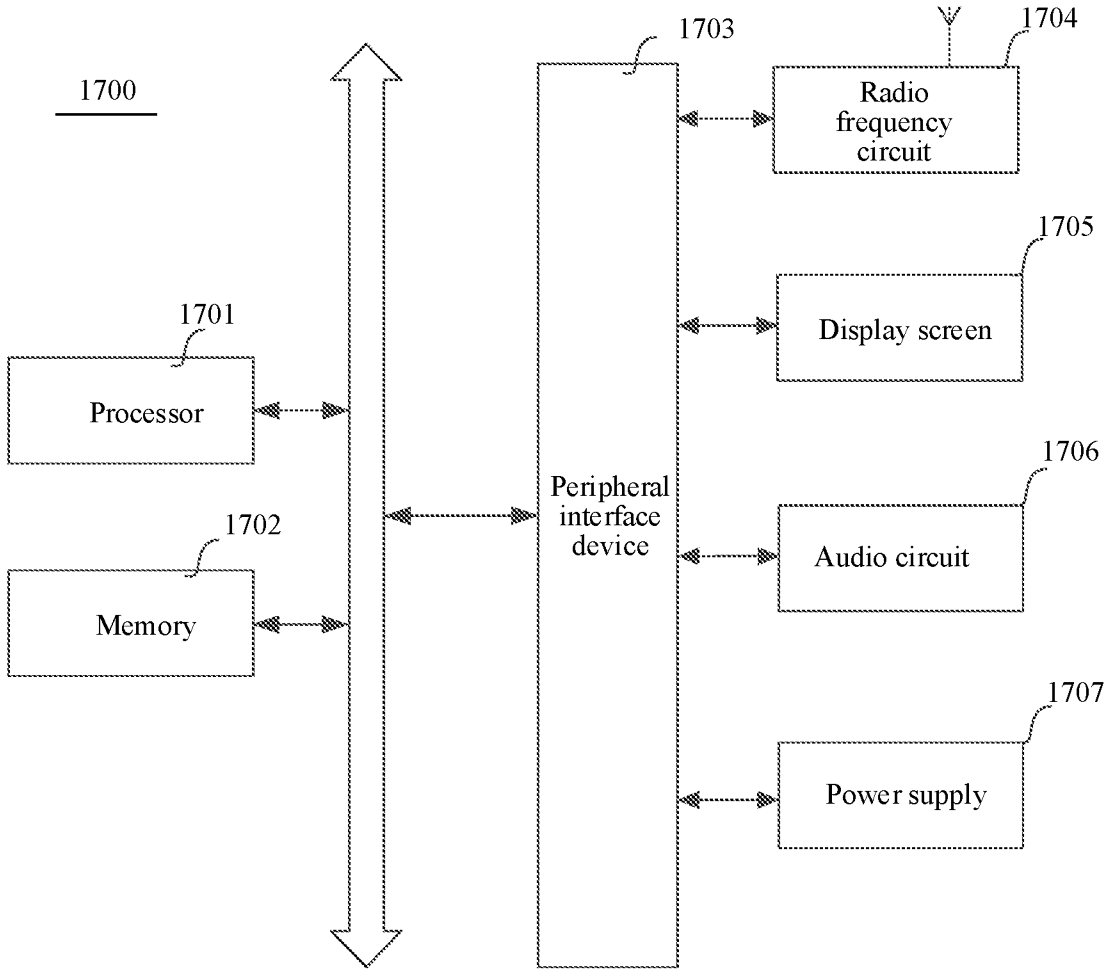
FIG. 17 is a structural block diagram of a terminal device according to an exemplary embodiment of this application.

FIG. 17 shows a structural block diagram of a terminal device according to an exemplary embodiment of this application.

The terminal device 1700 may be an electronic device, such as a smart phone, a tablet computer, an e-book reader, a multimedia playback device, a wearable device, or a PC. The terminal device is configured to implement the card casting method provided in the foregoing embodiments. The terminal device may be the terminal device 10 shown in FIG. 1.

Generally, the terminal device 1700 includes: a processor 1701 and a memory 1702.

The processor 1701 may include one or more processing cores, for example, a 4-core processor or an 8-core processor. The processor 1701 may be implemented in at least one hardware form of digital signal processing (DSP), a field programmable gate array (FPGA), and a programmable logic array (PLA). The processor 1701 may alternatively include a main processor and a coprocessor. The main processor is a processor configured to process data in an awake state, and is also referred to as a central processing unit (CPU). The coprocessor is a low power consumption processor configured to process data in a standby state. In some embodiments, the processor 1701 may be integrated with a graphics processing unit (GPU). The GPU is configured to render and draw content that needs to be displayed on a display screen. In some embodiments, the processor 1701 may further include an artificial intelligence (AI) processor. The AI processor is configured to process computing operations related to machine learning.

The memory 1702 may include one or more computer-readable storage media. The computer-readable storage medium may be tangible and non-transient. The memory 1702 may further include a high-speed random access memory and a non-volatile memory, for example, one or more disk storage devices or flash storage devices. In some embodiments, the non-transient computer-readable storage medium in the memory 1702 stores a computer program, and the computer program is loaded and executed by the processor 1701 to implement the card casting method provided in the foregoing method embodiments.

In some embodiments, the terminal device 1700 may alternatively include: a peripheral device interface 1703 and at least one peripheral device. The processor 1701, the memory 1702, and the peripheral device interface 1703 may be connected through a bus or a signal cable. Each peripheral device may be connected to the peripheral device interface 1703 through a bus, a signal cable, or a circuit board. Specifically, the peripheral device includes: at least one of a radio frequency circuit 1704, a display screen 1705, an audio circuit 1706, and a power supply 1707.

A person skilled in the art may understand that the structure shown in FIG. 17 constitutes no limitation on the terminal device 1700, and the terminal device may include more or fewer components than those shown in the figure, or some components may be combined, or a different component deployment may be used.

An embodiment of this application further provides a non-transitory computer-readable storage medium, the storage medium storing a computer program, and the computer program being loaded and executed by a processor to implement the card casting method provided in the foregoing method embodiments.

The computer-readable medium may include a computer storage medium and a communication medium. The computer storage medium includes volatile and non-volatile media, and removable and non-removable media implemented by using any method or technology used for storing information such as computer-readable programs, data structures, program modules, or other data. The computer storage medium includes a random access memory (RAM), a read-only memory (ROM), an erasable programmable read-only memory (EPROM), an electrically erasable programmable read-only memory (EEPROM), a flash memory or another solid-state memory technology, a digital video disc (DVD) or another optical memory, a tape cartridge, a magnetic cassette, a magnetic disk memory, or another magnetic storage device. Those skilled in art may know that the computer storage medium is not limited to the foregoing several types.

An embodiment of this application further provides a computer program product, the computer program product including a computer program, the computer program being stored in a non-transitory computer-readable storage medium, and a processor reading and executing the computer program from the computer-readable storage medium to implement the card casting method provided in the foregoing embodiments.

In this application, the term "module" or "unit" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module or unit can be implemented using one or more processors (or processors and memory). Likewise, a processor (or processors and memory) can be used to implement one or more modules or units. Moreover, each module or unit can be part of an overall module or unit that includes the functionalities of the module or unit. It is to be understood that the term "plurality" mentioned in the specification means two or more. The term "and/or" describes an association relationship between associated objects and represents three relationships. For example, A and/or B may represent: only A exists, both A and B exist, and only B exists. The character "/" generally indicates an "or" relationship between successive associated objects.

The foregoing descriptions are merely embodiments of this application, but are not intended to limit this application. Any modification, equivalent replacement, or improvement made within the spirit and principle of this application fall within the protection scope of this application.

What is claimed is:

1. A card casting method performed by a terminal device, the terminal device having a processor, a memory and a physical screen that are communicatively connected to each other, the memory storing a computer program implementing the method, and the method comprising:

displaying a game application interface on the physical screen, the game application interface including a map, a first card outside the map, and a plurality of candidate positions corresponding to the first card within the map;

while displaying the map on the physical screen, detecting by the processor, at a first location outside of the map, a first operation on the first card within the game application interface;

displaying, on the physical screen, a position selection control at the first location outside of the map in response to the first operation on the first card, the position selection control including a plurality of trigger regions outside of the map, each trigger region outside of the map corresponding to and different from a respective one of the plurality of candidate positions within the map, wherein a display region of the position selection control is smaller than a display region of the map;

while displaying the position selection control on the physical screen:

determining, by the processor, a target position within the map from the plurality of candidate positions in response to a second operation at a second location outside of the map on a corresponding target trigger region of the plurality of trigger regions; and while continuing to detect, by the processor, the second operation at the second location outside of the map, highlighting the target position within the map; and casting, by the processor, the first card to the target position within the map.

2. The method according to claim 1, wherein the determining a target position from the plurality of candidate positions comprises:

determining, from the plurality of trigger regions corresponding to the position selection control, a trigger region matching attribute information of the second operation as the target trigger region; and determining, among the plurality of candidate positions, a candidate position corresponding to the target trigger region as the target position.

3. The method according to claim 2, wherein the determining, among the plurality of candidate positions, a candidate position corresponding to the target trigger region as the target position comprises:

in response to a third operation on the target trigger region of the position selection control, determining the target position from the plurality of candidate positions according to attribute information of the third operation.

4. The method according to claim 1, wherein the position selection control includes a plurality of indicator elements, each indicator element corresponding to a respective one of the plurality of candidate positions; and a target indicator element corresponding to the target position is displayed visually distinctively from others of the plurality of indicator elements.

5. The method according to claim 1, wherein the displaying a position selection control comprises:

determining a display position of the position selection control based on a display position of the first card; and displaying the position selection control at the display position of the position selection control.

6. The method according to claim 1, wherein the method further comprises:

canceling the determination of the target position from the plurality of candidate positions when the second operation satisfies a first condition.

7. The method according to claim 1, wherein after displaying the position selection control, the method further comprises:

using a recommended candidate position among the plurality of candidate positions as an initialized target position, the recommended candidate position being a candidate position that is determined from the plurality of candidate positions and that satisfies a second condition in terms of fitness with the first card.

8. A terminal device comprising a processor and a memory and a physical screen that are communicatively connected to each other, the memory storing a computer program, and the computer program, when loaded and executed by the processor, causing the terminal device to implement a card casting method including:

displaying a game application interface on the physical screen, the game application interface including a map, a first card outside the map, and a plurality of candidate positions corresponding to the first card within the map;

while displaying the map on the physical screen, detecting by the processor, at a first location outside of the map, a first operation on the first card within the game application interface;

displaying, on the physical screen, a position selection control at the first location outside of the map in response to the first operation on the first card, the position selection control including a plurality of trigger regions outside of the map, each trigger region outside of the map corresponding to and different from a respective one of the plurality of candidate positions within the map, wherein a display region of the position selection control is smaller than a display region of the map;

while displaying the position selection control on the physical screen:

determining, by the processor, a target position within the map from the plurality of candidate positions in response to a second operation at a second location outside of the map on a corresponding target trigger region of the plurality of trigger regions; and while continuing to detect, by the processor, the second operation at the second location outside of the map, highlighting the target position within the map; and casting, by the processor, the first card to the target position within the map.

9. The terminal device according to claim 8, wherein the determining a target position from the plurality of candidate positions comprises:

determining, from the plurality of trigger regions corresponding to the position selection control, a trigger region matching attribute information of the second operation as the target trigger region; and determining, among the plurality of candidate positions, a candidate position corresponding to the target trigger region as the target position.

10. The terminal device according to claim 9, wherein the determining, among the plurality of candidate positions, a candidate position corresponding to the target trigger region as the target position comprises:

in response to a third operation on the target trigger region of the position selection control, determining the target position from the plurality of candidate positions according to attribute information of the third operation.

11. The terminal device according to claim 8, wherein the position selection control includes a plurality of indicator elements, each indicator element corresponding to a respective one of the plurality of candidate positions; and a target indicator element corresponding to the target position is displayed visually distinctively from others of the plurality of indicator elements.

12. The terminal device according to claim 8, wherein the displaying a position selection control comprises:

determining a display position of the position selection control based on a display position of the first card; and displaying the position selection control at the display position of the position selection control.

13. The terminal device according to claim 8, wherein the method further comprises:

canceling the determination of the target position from the plurality of candidate positions when the second operation satisfies a first condition.

14. The terminal device according to claim 8, wherein after displaying the position selection control, the method further comprises:

using a recommended candidate position among the plurality of candidate positions as an initialized target position, the recommended candidate position being a candidate position that is determined from the plurality of candidate positions and that satisfies a second condition in terms of fitness with the first card.

15. A non-transitory computer-readable storage medium, storing a computer program, and the computer program, when loaded and executed by a processor of a terminal device having a physical screen, causing the terminal device to implement a card casting method including:

displaying a game application interface on the physical screen, the game application interface including a map, a first card outside the map, and a plurality of candidate positions corresponding to the first card within the map;

while displaying the map on the physical screen, detecting by the processor, at a first location outside of the map, a first operation on the first card within the game application interface;

displaying, on the physical screen, a position selection control at the first location outside of the map in response to the first operation on the first card, the position selection control including a plurality of trigger regions outside of the map, each trigger region outside of the map corresponding to and different from a respective one of the plurality of candidate positions within the map, wherein a display region of the position selection control is smaller than a display region of the map;

while displaying the position selection control on the physical screen:

determining, by the processor, a target position within the map from the plurality of candidate positions in response to a second operation at a second location outside of the map on a corresponding target trigger region of the plurality of trigger regions; and while continuing to detect, by the processor, the second operation at the second location outside of the map, highlighting the target position within the map; and casting, by the processor, the first card to the target position within the map.

16. The non-transitory computer-readable storage medium according to claim 15, wherein the determining a target position from the plurality of candidate positions comprises:

determining, from the plurality of trigger regions corresponding to the position selection control, a trigger region matching attribute information of the second operation as the target trigger region; and determining, among the plurality of candidate positions, a candidate position corresponding to the target trigger region as the target position.

17. The non-transitory computer-readable storage medium according to claim 15, wherein the position selection control includes a plurality of indicator elements, each indicator element corresponding to a respective one of the plurality of candidate positions;

and a target indicator element corresponding to the target position is displayed visually distinctively from others of the plurality of indicator elements.

18. The non-transitory computer-readable storage medium according to claim 15, wherein the displaying a position selection control comprises:

determining a display position of the position selection control based on a display position of the first card; and displaying the position selection control at the display position of the position selection control.

19. The non-transitory computer-readable storage medium according to claim 15, wherein the method further comprises:

canceling the determination of the target position from the plurality of candidate positions when the second operation satisfies a first condition.

20. The non-transitory computer-readable storage medium according to claim 15, wherein after displaying the position selection control, the method further comprises:

using a recommended candidate position among the plurality of candidate positions as an initialized target position, the recommended candidate position being a candidate position that is determined from the plurality of candidate positions and that satisfies a second condition in terms of fitness with the first card.

* * * * *